(12) United States Patent
Abe

(10) Patent No.: US 9,971,630 B2
(45) Date of Patent: May 15, 2018

(54) INFORMATION PROCESSING APPARATUS AND JOB SUBMISSION METHOD

(71) Applicant: FUJITSU LIMITED, Kawasaki-shi, Kanagawa (JP)

(72) Inventor: Fumitake Abe, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/470,986

(22) Filed: Mar. 28, 2017

(65) Prior Publication Data

US 2017/0344395 A1 Nov. 30, 2017

(30) Foreign Application Priority Data

May 25, 2016 (JP) ................. 2016-103852

(51) Int. Cl.
 G06F 9/46 (2006.01)
 G06F 9/48 (2006.01)

(52) U.S. Cl.
 CPC ................. *G06F 9/4881* (2013.01)

(58) Field of Classification Search
 None
 See application file for complete search history.

(56) References Cited

FOREIGN PATENT DOCUMENTS

| JP | 2005-011023 | | 1/2005 |
|---|---|---|---|
| JP | 2010231694 | * | 3/2009 |
| JP | 2010-231694 | | 10/2010 |
| JP | 2013140490 | * | 1/2012 |
| JP | 2013-140490 | | 7/2013 |

* cited by examiner

*Primary Examiner* — Sisley Kim
(74) *Attorney, Agent, or Firm* — Fujitsu Patent Center

(57) ABSTRACT

An information processing apparatus calculates, for each of a plurality of job execution conditions indicating a registration destination queue and a designated degree of parallelism, an estimated start time indicating an estimated time at which execution of a new job starts. The information processing apparatus calculates an execution time of the new job for each of the plurality of degrees of parallelism. The information processing apparatus calculates, for each of the job execution conditions, an estimated end time indicating an estimated time at which execution of the new job ends. The information processing apparatus registers a new job execution request for execution of the new job with the designated degree of parallelism indicated in an earliest job execution condition that gives the earliest execution end time among the job execution conditions, in the registration destination queue indicated in the earliest job execution condition.

6 Claims, 22 Drawing Sheets

INFORMATION PROCESSING APPARATUS AND JOB SUBMISSION METHOD

CROSS-REFERENCE TO RELATED APPLICATION

This application is based upon and claims the benefit of priority of the prior Japanese Patent Application No. 2016-103852, filed on May 25, 2016, the entire contents of which are incorporated herein by reference.

FIELD

The embodiments discussed herein are related to an information processing apparatus and a job submission method.

BACKGROUND

High performance computing (HPC) includes a plurality of computing nodes that execute jobs and a management node that manages job execution instructions to the computing nodes. When a job execution request is entered, a scheduler in the management node determines a job execution schedule to execute the job in batch processing.

In job scheduling in HPC, jobs are executed in batch processing. Therefore, a job that the user wants to execute is not always executed immediately. For example, a job execution request is placed into a queue. Generally, the job that is queued first is executed first. However, the order in which jobs are executed may be changed in accordance with the degree of parallelism for each job. The degree of parallelism (DOP) for a job indicates the number of computing nodes that execute the job in parallel. For example, in some cases, while an earlier-queued job with a high degree of parallelism is waiting for execution until the number of computing nodes corresponding to the degree of parallelism for the job become available, a later-queued job with a low degree of parallelism is executed first.

Various techniques are used in job scheduling. For example, there has been proposed a job schedule change support system that obtains a practical scheduled execution time period when changing a preregistered schedule to execute a job scenario. There has also been proposed a job scheduling method capable of reducing the risk that a job schedule fails, and capable of presenting the degree of optimization of job schedule. There has also been proposed a parallel computing control apparatus capable of reducing the search time in a multi-job system that searches a parameter space.

See, for example, Japanese Laid-open Patent Publications No. 2010-231694, No. 2005-11023, and No. 2013-140490.

Jobs executed in HPC include various types of jobs. Among those, there is a job that is run repeatedly as in the case of test runs before the actual run. It is important for such a job to minimize the turnaround time. Turnaround time is the time from when an execution request is entered to when the output of the execution result is completed.

The turnaround time of a job greatly varies depending on the degree of parallelism for the job. For example, if the degree of parallelism is low, it takes a long time to execute the job, but the waiting time for execution of the job tends to be short. On the other hand, if the degree of parallelism is high, it takes a short time to execute the job, but the waiting time for execution of the job tends to be long. The degree of parallelism that minimizes the turnaround time is dependent on the number of available computing nodes that are not executing a job, among computing nodes as the job submission destinations in the queue to which the job is submitted. For example, in the case of a queue having a sufficient number of computing nodes to execute a job waiting for execution, the turnaround time may be reduced by increasing the degree of parallelism. In the case of a queue not having a sufficient number of computing nodes to execute a job waiting for execution, the turnaround time is likely to be reduced by reducing the degree of parallelism and starting execution of the job early.

In this way, the degree of parallelism appropriate to reduce the turnaround time is dependent on the status of jobs waiting for execution in a queue, and the resource amount of computing nodes. However, the status of jobs in the queue changes from moment to moment. Therefore, it is difficult for the user to appropriately determine a job execution condition, such the degree of the parallelism and the queue into which a job is be placed, so as to reduce the turnaround time.

SUMMARY

According to one aspect of the invention, there is provided an information processing apparatus that includes: a memory; and a processor connected to the memory and configured to perform a procedure including: acquiring schedule information indicating an execution schedule of a job execution request registered in each one of at least one queue, generating a plurality of job execution conditions each indicating one of the at least one queue as a registration destination queue and one of a plurality of degrees of parallelism as a designated degree of parallelism, calculating an estimated start time for each of the plurality of job execution conditions, based on the schedule information, the estimated start time indicating an estimated time at which execution of a new job starts when a new job execution request for execution of the new job with the designated degree of parallelism is registered in the registration destination queue, calculating an execution time of the new job for each of the plurality of degrees of parallelism, based on an execution time of the new job with a predetermined degree of parallelism, calculating an estimated end time for said each job execution condition, based on the estimated start time for said each job execution condition and the execution time of the new job with the designated degree of parallelism indicated in said each job execution condition, the estimated end time indicating an estimated time at which execution of the new job ends when the new job execution request specifying the designated degree of parallelism indicated in said each job execution condition is registered in the registration destination queue indicated in said each job execution condition, and registering the new job execution request for execution of the new job with the designated degree of parallelism indicated in an earliest job execution condition that gives an earliest execution end time among the plurality of job execution conditions, in the registration destination queue indicated in the earliest job execution condition.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
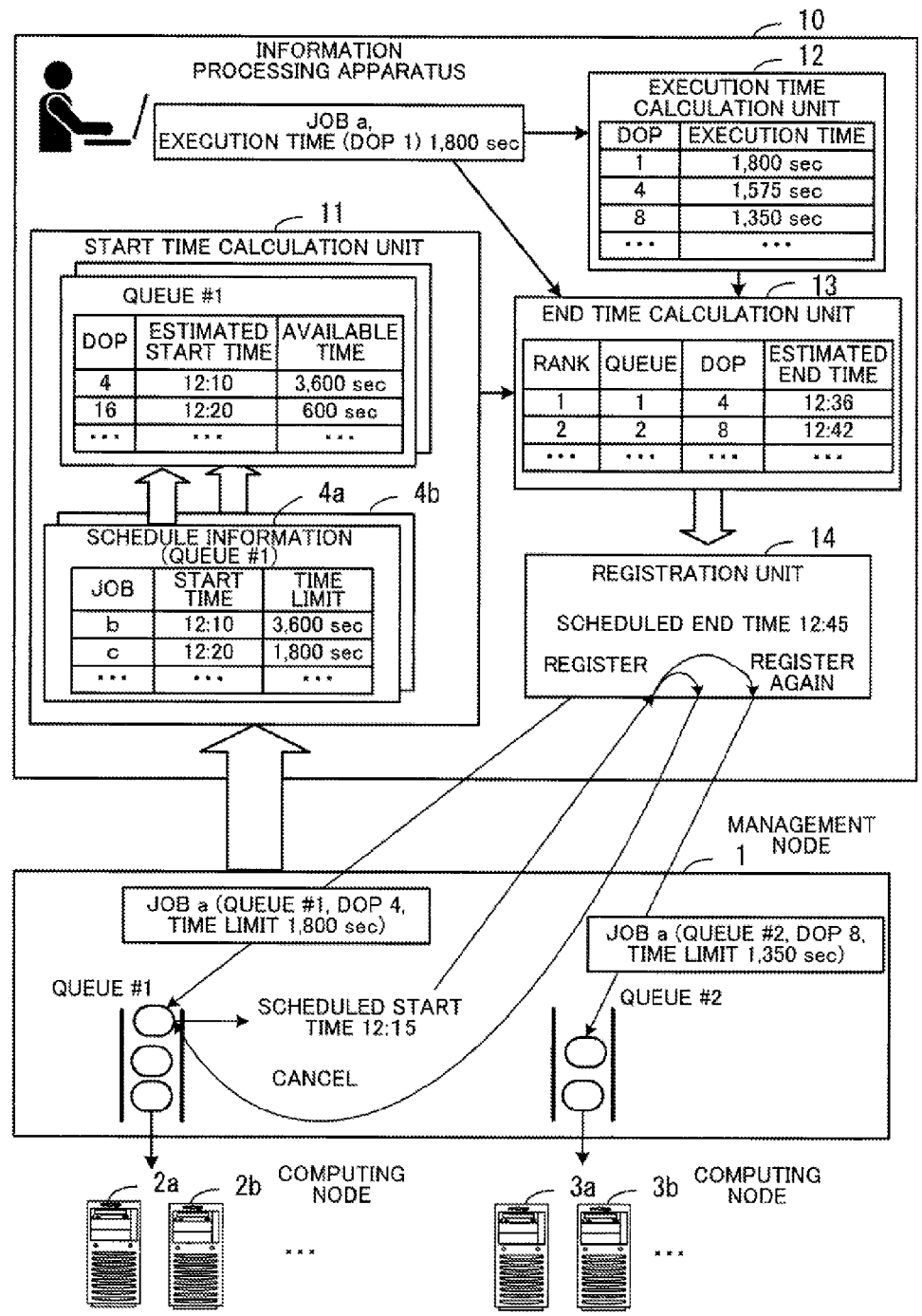
FIG. 1 illustrates an exemplary configuration of a system according to a first embodiment.

Several embodiments will be described below with reference to the accompanying drawings, wherein like reference numerals refer to like elements throughout. Features of certain embodiments may be combined with features of other embodiments as long as no inconsistency arises.

(a) First Embodiment

FIG. 1 illustrates an exemplary configuration of a system according to a first embodiment. An information processing apparatus 10 is connected to a management node 1 that manages jobs to be executed by computing nodes 2a, 2b, and so on, and computing nodes 3a, 3b, and so on. The information processing apparatus 10 submits a job to the management node 1 in response to an instruction from the user. Submission of a job is an operation of transmitting to the management node 1 a job execution request specifying a queue of the management node 1.

The management node 1 has a plurality of queues in which job execution requests are registered. Job execution requests registered in a queue #1 are executed by the computing nodes 2a, 2b, and so on. Job execution requests registered in a queue #2 are executed by the computing nodes 3a, 3b, and so on. The management node 1 schedules the job execution start time for each queue.

When the user wants to execute a job on the computing nodes 2a, 2b, and so on and the computing nodes 3a, 3b, and so on, the user enters the job to be executed and the execution time of the job with a predetermined degree of parallelism into the information processing apparatus 10. Then, the information processing apparatus 10 submits to the management node 1 the job with a job execution condition that minimizes the turnaround time (the time from when an execution request is entered to when the result is output). The job execution condition includes, for example, the degree of parallelism for a job, and the registration destination queue. In order to perform such a job submission process, the information processing apparatus 10 includes a start time calculation unit 11, an execution time calculation unit 12, an end time calculation unit 13, and a registration unit 14.

The start time calculation unit 11 acquires, from the management node 1, pieces of schedule information 4a and 4b each indicating an execution schedule of a job execution request registered in a respective one of at least one queue. Then, the start time calculation unit 11 generates a plurality of job execution conditions each indicating one of the at least one queue as a registration destination queue and one of a plurality of degrees of parallelism as a designated degree of parallelism. Further, the start time calculation unit 11 calculates an estimated start time for each of the job execution conditions, based on the pieces of schedule information 4a and 4b. The estimated start time indicates an estimated time at which execution of a new job starts when a new job execution request for execution of the new job with the designated degree of parallelism is registered in the registration destination queue.

For example, the start time calculation unit 11 calculates temporal changes in the number of available computing nodes not executing a job, among a set of computing nodes that execute job execution requests accumulated in the registration destination queue indicated in the job execution condition. The start time calculation unit 11 specifies, as the estimated start time for the job execution condition, the earliest time in an available period in which a number of available computing nodes corresponding to the designated degree of parallelism indicated in the job execution condition are present in the temporal changes.

Further, the start time calculation unit 11 is able to calculate the available time indicating the length of the available period, in the temporal changes in the registration destination queue indicated in the job execution condition.

The execution time calculation unit 12 calculates an execution time of the new job for each of the plurality of degrees of parallelism, based on an execution time of the new job with the predetermined degree of parallelism. For example, the execution time calculation unit 12 calculates an execution time for each of the degrees op parallelism, based on an execution time of the new job with the predetermined degree of parallelism entered by the user, such that the execution time decreases as the degree of parallelism increases, and the execution time increases as the degree of parallelism decreases.

The end time calculation unit 13 calculates an estimated end time for each of the job execution conditions, based on the estimated start time for the job execution condition and the execution time of the new job with the designated degree of parallelism indicated in the job execution condition. The estimated end time indicates an estimated time at which execution of a new job ends when a new job execution request specifying the designated degree of parallelism indicated in the job execution condition is registered in the registration destination queue indicated in the job execution condition. The end time calculation unit 13 sorts the job execution conditions in the order of earlier estimated end time, for example.

Note that the end time calculation unit 13 stops calculation of the estimated end time for the job execution condition when the available time calculated for the job execution condition is less than the execution time with the designated degree of parallelism indicated in the job execution condition. If calculation of the estimated end time for the job execution condition is stopped, the job execution condition is not used upon job registration by the registration unit 14.

The registration unit 14 registers the new job execution request for execution of the new job with the designated degree of parallelism indicated in an earliest job execution condition that gives the earliest execution end time among the job execution conditions, in the registration destination queue indicated in the earliest job execution condition. Note that the new job execution request includes a time limit for occupation of computing nodes by the job, for example. The value of the time limit is equal to the value of the execution time calculated based on the degree of parallelism by the execution time calculation unit 12.

Further, the registration unit 14 acquires, from the management node 1, an execution schedule of the new job execution request that is registered in accordance with the earliest job execution condition. Then, the registration unit 14 calculates a scheduled end time by adding the execution time of the new job with the designated degree of parallelism indicated in the earliest job execution condition to a scheduled execution start time indicating an execution start time of the new job on the acquired execution schedule. Then, the registration unit 14 compares the scheduled end time with the estimated end times for the job execution conditions other than the earliest job execution condition. If the scheduled end time is later than the estimated end time for any of the other job execution conditions, the registration unit 14 cancels the new job execution request that is registered in accordance with the earliest job execution condition. Then, the registration unit 14 registers, in the registration destination queue indicated in the other job execution condition, a revised new job execution request for execution of the new job with the designated degree of parallelism indicated in the other job execution condition.

According to the system described above, the start time calculation unit 11 calculates an estimated start time for each job execution condition indicating a degree of parallelism and a registration destination queue, based on an execution schedule of jobs for each queue in the management node 1. Further, the execution time calculation unit 12 calculates an execution time of the job for each of the plurality of degrees of parallelism, based on an execution time of the job with a predetermined degree of parallelism entered by the user. Then, the end time calculation unit 13 calculates an estimated end time for each of the job execution conditions, based on the estimated start time and the execution time for each of the job execution conditions. The estimated end time is an estimated value of a turnaround time of the job. Then, the registration unit 14 submits the job to the management node 1 in accordance with the job execution condition that gives the earliest estimated end time. In the example of FIG. 1, a job execution request specifying a degree of parallelism of "4" is registered in the queue #1.

When the job execution request is registered, the management node 1 schedules the execution start time of the job. The algorithm used for scheduling differs from queue to queue, and scheduling is performed in view of various conditions other than the availability of computing nodes. Therefore, in some cases, even if there are a number of available computing nodes corresponding to the degree of parallelism specified in the job execution request, the job is not executed immediately. Thus, after scheduling is complete, the management node 1 transmits the scheduled start time, that is, the execution start time on the schedule, of the job execution request registered in the queue to the information processing apparatus 10. Then, in the information processing apparatus 10, the registration unit 14 calculates a scheduled end time of the job. The registration unit 14 determines whether there is any job execution condition that gives an estimated end time earlier than the scheduled end time.

In the example of FIG. 1, an estimated end time "12:42" obtained when the job execution request is registered with the second job execution condition in the order sorted by the end time calculation unit 13 is earlier than a scheduled end time "12:45" of the first job execution condition. If the estimated end time for another job execution condition is earlier as described above, the job execution request registered earlier is canceled. For example, the registration unit 14 transmits an instruction to cancel the job execution request to the management node 1. In response to the instruction, the management node 1 removes the job execution request from the queue. Then, a job execution request for execution of the job under the other job execution condition is submitted to the management node 1. For example, a job execution request specifying, for example, a degree of parallelism of "8" is registered in the queue #2.

In this manner, when the user only enters a job to be executed, together with information specifying an execution time of the job with a predetermined degree of parallelism (for example, an execution time of the job with a degree of parallelism of "1"), into the information processing apparatus 10, a job execution condition that achieves the best turnaround time is automatically determined. Then, a job execution request for execution of the job under the determined job execution condition is transmitted to the management node 1. Thus, it is possible to efficiently execute a job that is run repeatedly as in the case of test runs, for example.

Further, a check is made as to whether the actual schedule result matches the estimation. Then, if the scheduled end time is later than the estimated time and there is another job execution condition that achieves a shorter turnaround time, a job execution request is submitted again. Accordingly, even when the details of the job scheduling algorithm in the management node 1 are unknown, it is possible to execute the job under an appropriate job execution condition.

The start time calculation unit 11, the execution time calculation unit 12, the end time calculation unit 13, and the registration unit 14 may be implemented by the processor of the information processing apparatus 10, for example. The lines connecting the elements of FIG. 1 represent some of communication paths. Communication paths other than those of FIG. 1 may be provided.

(b) Second Embodiment

Next, a second embodiment will be described.

Figure 2:
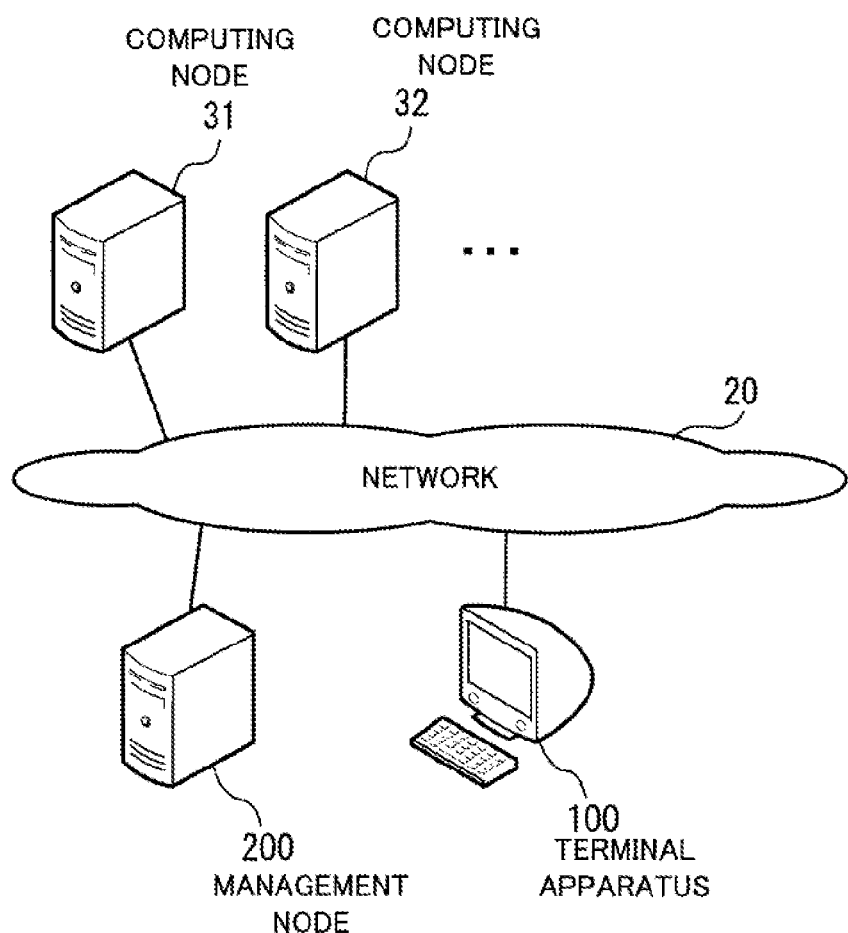
FIG. 2 illustrates an exemplary configuration of a system according to a second embodiment.

FIG. 2 illustrates an exemplary configuration of a system according to the second embodiment. A plurality of computing nodes 31, 32, and so on, a management node 200, and a terminal apparatus 100 are connected via a network 20.

The plurality of computing nodes 31, 32, and so on are computers that execute jobs. The management node 200 is a computer that instructs the plurality of computing nodes 31, 32, and so on to execute jobs. The terminal apparatus 100 is a computer that submits a job to be executed to the management node 200.

Figure 3:
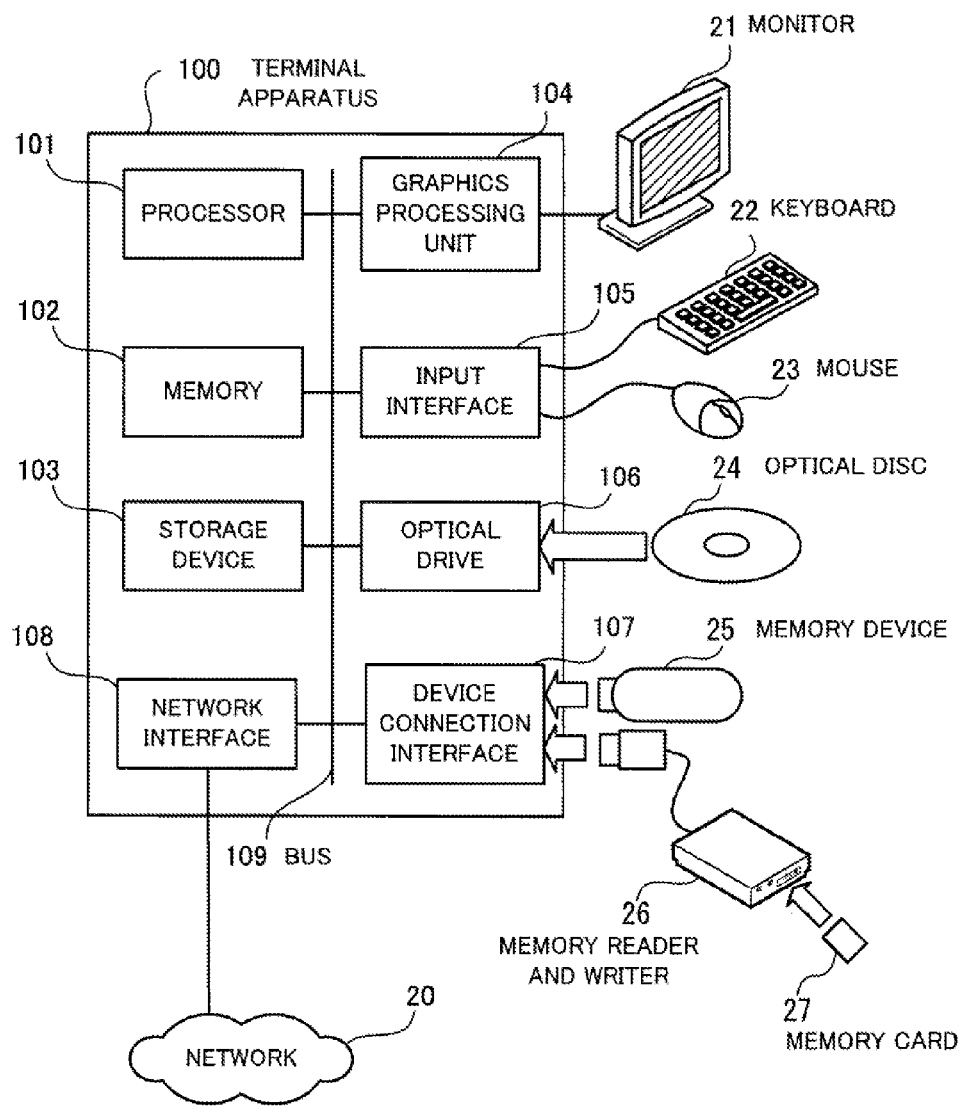
FIG. 3 illustrates an exemplary hardware configuration of a terminal apparatus.

FIG. 3 illustrates an exemplary hardware configuration of the terminal apparatus 100. The entire operation of the terminal apparatus 100 is controlled by a processor 101. A memory 102 and a plurality of peripheral devices are connected to the processor 101 via a bus 109. The processor 101 may be a multiprocessor. Examples of the processor 101 include a central processing unit (CPU), a micro processing unit (MPU), and a digital signal processor (DSP). At least a part of functions provided by a program executed by the processor 101 may be implemented by using electronic circuits such as an application-specific integrated circuit (ASIC), a programmable logic device (PLD), and the like.

The memory 102 is used as a primary storage device of the terminal apparatus 100. The memory 102 temporarily stores at least part of the operating system (OS) program and application programs that are executed by the processor 101. The memory 102 also stores various types of data needed for the processing performed by the processor 101. Examples of the memory 102 include a volatile semiconductor storage device such as a random access memory (RAM) and the like.

The peripheral devices connected to the bus 109 include a storage device 103, a graphics processing unit 104, an input interface 105, an optical drive 106, a device connection interface 107, and a network interface 108.

The storage device 103 magnetically writes data to and reads data from its internal storage medium. The storage device 103 is used as a secondary storage device of the computer. The storage device 103 stores the OS program, application programs, and various types of data. The storage device 103 may be a hard disk drive (HDD) or a solid state drive (SSD), for example.

A monitor 21 is connected to the graphics processing unit 104. The graphics processing unit 104 displays an image on the screen of the monitor 21 in accordance with an instruction from the processor 101. Examples of the monitor 21 include a display device using a cathode ray tube (CRT), a liquid crystal display device, and the like.

A keyboard 22 and a mouse 23 are connected to the input interface 105. The input interface 105 receives signals from the keyboard 22 and the mouse 23, and transmits the received signals to the processor 101. The mouse 23 is an example of a pointing device, and other types of pointing devices may also be used. Examples of other types of pointing devices include a touch panel, a tablet, a touch pad, a track ball, and the like.

The optical drive 106 reads data from an optical disc 24 by using laser beams or the like. The optical disc 24 is a portable storage medium and stores data such that the data may be read through optical reflection. Examples of the optical disc 24 include digital versatile disc (DVD), DVD-RAM, compact disc read only memory (CD-ROM), CD-Recordable (CD-R), CD-Rewritable (CD-RW), and the like.

The device connection interface 107 is a communication interface that connects peripheral devices to the terminal apparatus 100. For example, a memory device 25 and a memory reader and writer 26 may be connected to the device connection interface 107. The memory device 25 is a storage medium having a function to communicate with the device connection interface 107. The memory reader and writer 26 is a device that writes data to and reads data from a memory card 27. The memory card 27 is a card-type storage medium.

The network interface 108 is connected to the network 20. The network interface 108 exchanges data with other computers or communication apparatuses via the network 20.

With the hardware configuration described above, it is possible to provide the processing functions of the second embodiment. Note that the computing nodes 31, 32, and so on and the management node 200 may be implemented with the same hardware configuration as that of the terminal apparatus 100. Also, the information processing apparatus 10 of the first embodiment may be implemented with the same hardware configuration as that of the terminal apparatus 100 of FIG. 3.

The terminal apparatus 100 provides the processing functions of the second embodiment by executing a program stored in a computer-readable storage medium, for example. The program describing the procedure to be performed by the terminal apparatus 100 may be stored in various storage media. For example, the program to be executed by the terminal apparatus 100 may be stored in the storage device 103. The processor 101 loads at least part of the program from the storage device 103 into the memory 102 so as to execute the program. The program to be executed by the terminal apparatus 100 may also be stored in a portable storage medium, such as the optical disc 24, the memory device 25, the memory card 27, and the like. The program stored in the portable storage medium may be executed after being installed into the storage device 103 under the control of, for example, the processor 101. Further, the processor 101 may execute the program by reading the program directly from the portable storage medium.

Next, a description will be given of scheduling of batch processing in HPC. In HPC, the user submits a job to the management node 200 by using the terminal apparatus 100. The management node 200 assigns a job to one or more computing nodes in view of whether the computing nodes are available. When a computer node is available, it means that the computer node is not executing a job. Then, the management node 200 causes the assignment destination computing nodes to execute the job.

The number of computing nodes to which the job is assigned is determined based on the degree of parallelism specified upon submission of the job. The higher the degree of parallelism for a job is, the shorter the execution time of the job is. However, when the degree of parallelism for a job is high, the job often needs to wait for execution until a number of computing nodes corresponding to the degree of parallelism become available. Hereinafter, the differences in job assignment depending on the degree of parallelism will be described with reference to FIGS. 4 and 5.

Figure 4:
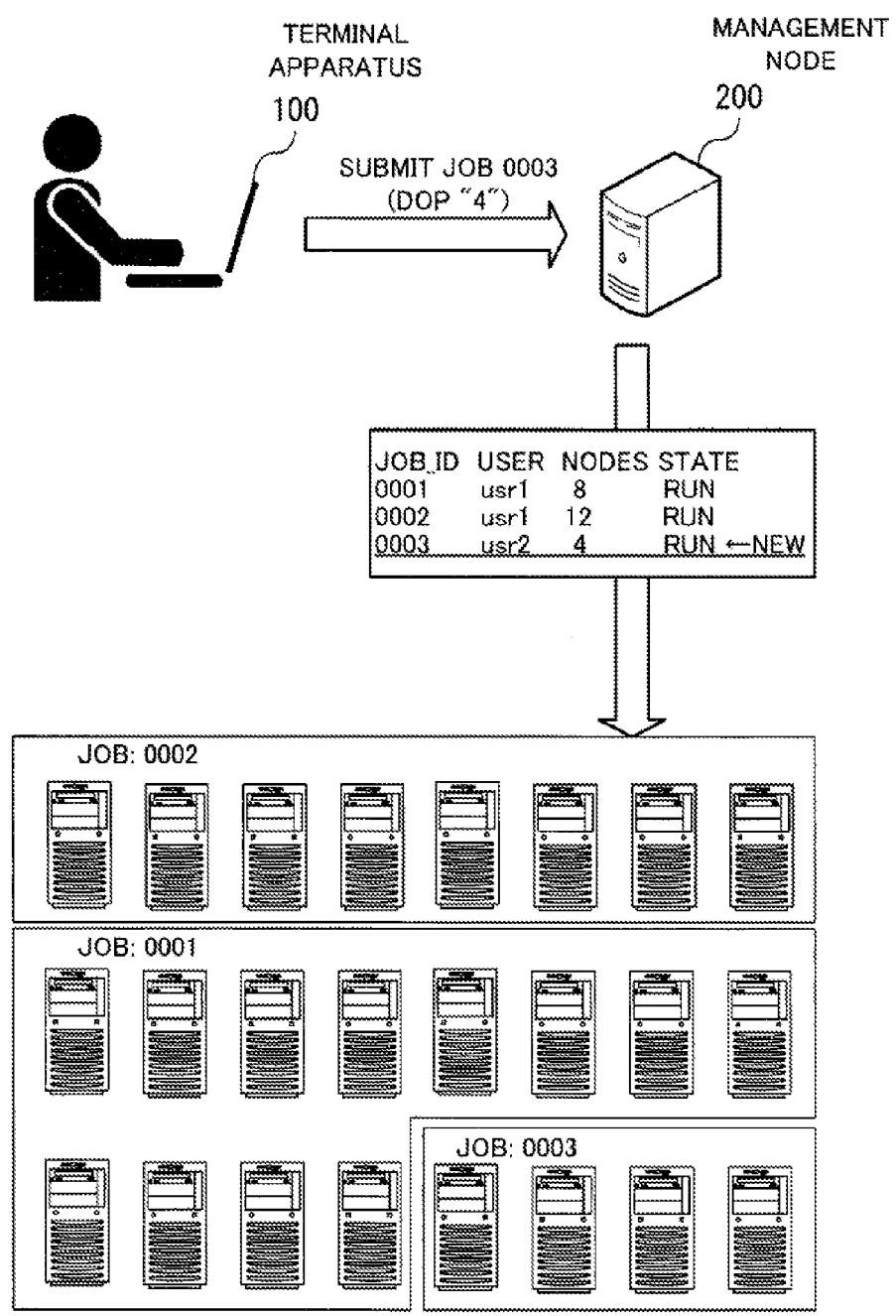
FIG. 4 illustrates an example of job scheduling in the case where the degree of parallelism is low.

FIG. 4 illustrates an example of job scheduling in the case where the degree of parallelism is low. In the example of FIG. 4, the user newly submits a job with a degree of parallelism of "4" to the management node 200 by using the terminal apparatus 100. In this case, since there are four available computing nodes, the newly submitted job is assigned to the four computing nodes. Then, the management node 200 instructs the assignment destination computing nodes to execute the newly submitted job.

Figure 5:
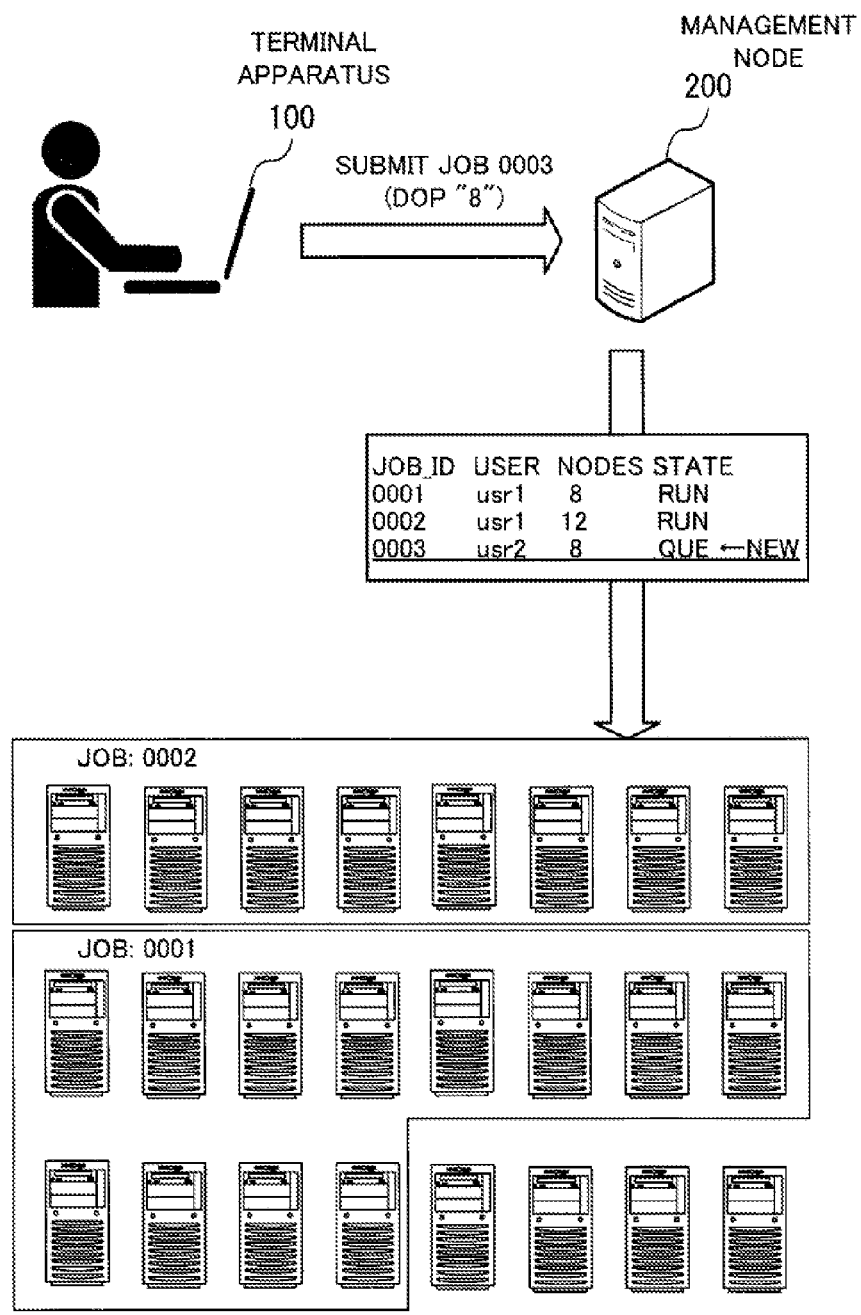
FIG. 5 illustrates an example of job scheduling in the case where the degree of parallelism is high.

FIG. 5 illustrates an example of job scheduling in the case where the degree of parallelism is high. In the example of FIG. 5, the user newly submits a job with a degree of parallelism of "8" to the management node 200 by using the terminal apparatus 100. However, there are only four available computing nodes. Therefore, it is not possible to immediately assign the job to computing nodes, so that the job is placed in a queue and waits for execution.

In this manner, even when there are available computing nodes, allocation of computing node resources to a job with a high degree of parallelism is often put off. Note that even when there are 24 available computing nodes, computing nodes are not always allocated to a job with a degree of parallelism of "20" by a scheduler. For example, in order to prepare for an emergent execution of a job of high importance, some schedulers do not allocate resources to a job of low importance when there are not many available computing nodes. That is, a determination of whether to allocate computing nodes to a job is not dependent only on the number of available computing nodes.

Further, the management node 200 may have a plurality of queues. The computing nodes that may be used differ from queue to queue, for example. The algorithm used to allocate computing nodes also differs from queue to queue.

Figure 6:
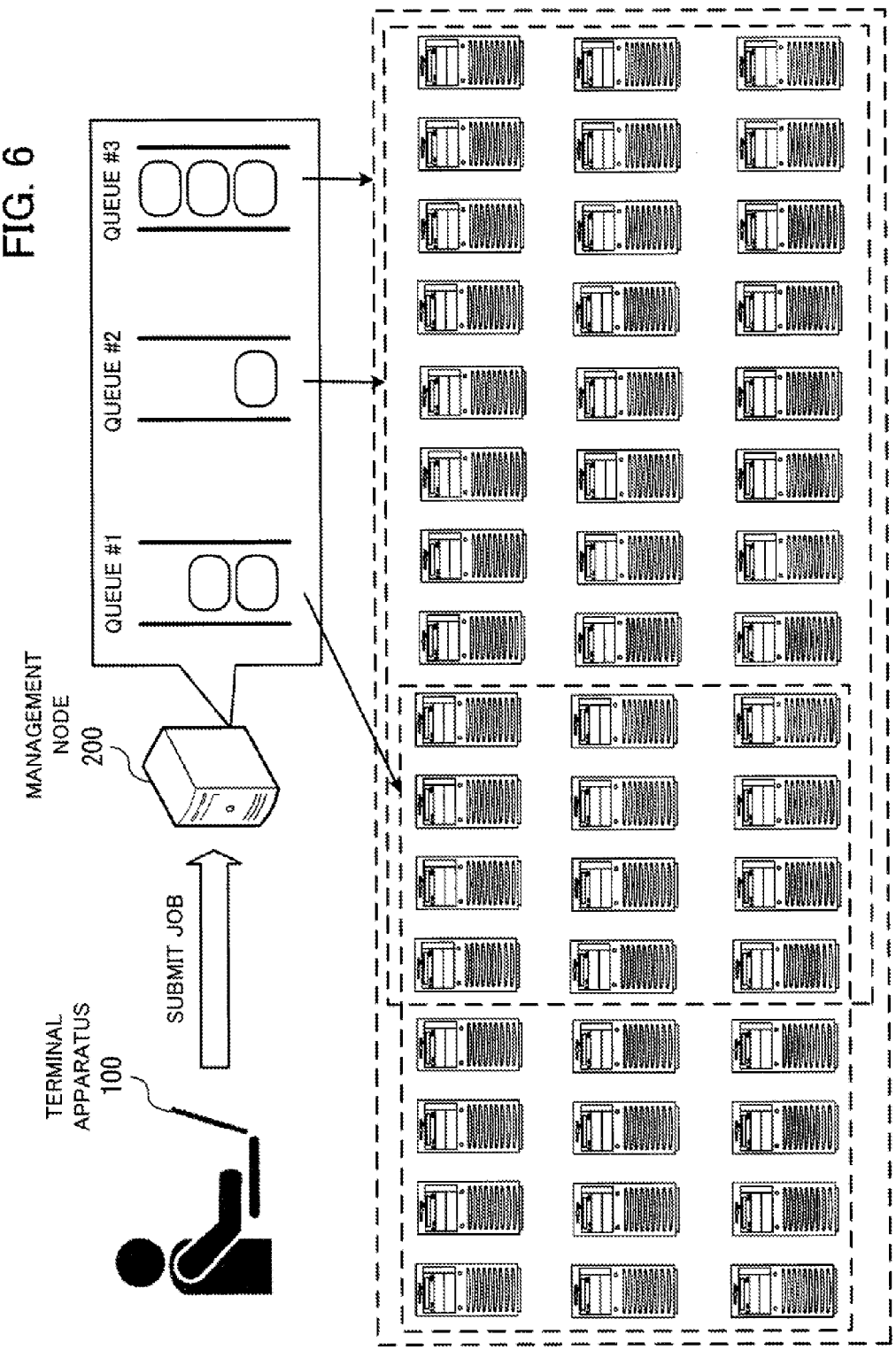
FIG. 6 illustrates an example of computing nodes that may be used by each of the plurality of queues.

FIG. 6 illustrates an example of computing nodes that may be used by each of the plurality of queues. For example, a queue #1 may use 24 computing nodes. A queue #2 may use 36 computing nodes. Among the computing nodes that may be used by the queue #1, 12 computing nodes may be used also by the queue #2. A queue #3 may use all the computing nodes.

In this manner, when there are a plurality of queues, the computing nodes that may be used differ from queue to queue. As the computing nodes that may be used differ, the turnaround time of a job differs depending on which queue the job is placed in. Note that it is possible to specify to which queue the job is submitted, by using the terminal apparatus 100, when submitting the job to the management node 200. That is, it is possible to reduce the turnaround time by selecting an appropriate destination queue.

Note that since different queues use different algorithm to allocate resources, it is difficult to accurately determine which queue minimizes the turnaround time of a job. Thus, in the second embodiment, a check is made as to whether a submitted job is executed as estimated. Then, if the job is scheduled such that execution is started than the estimated time, the submitted job is canceled, and the job is submitted again after changing the degree of parallelism or the queue.

Figure 7:
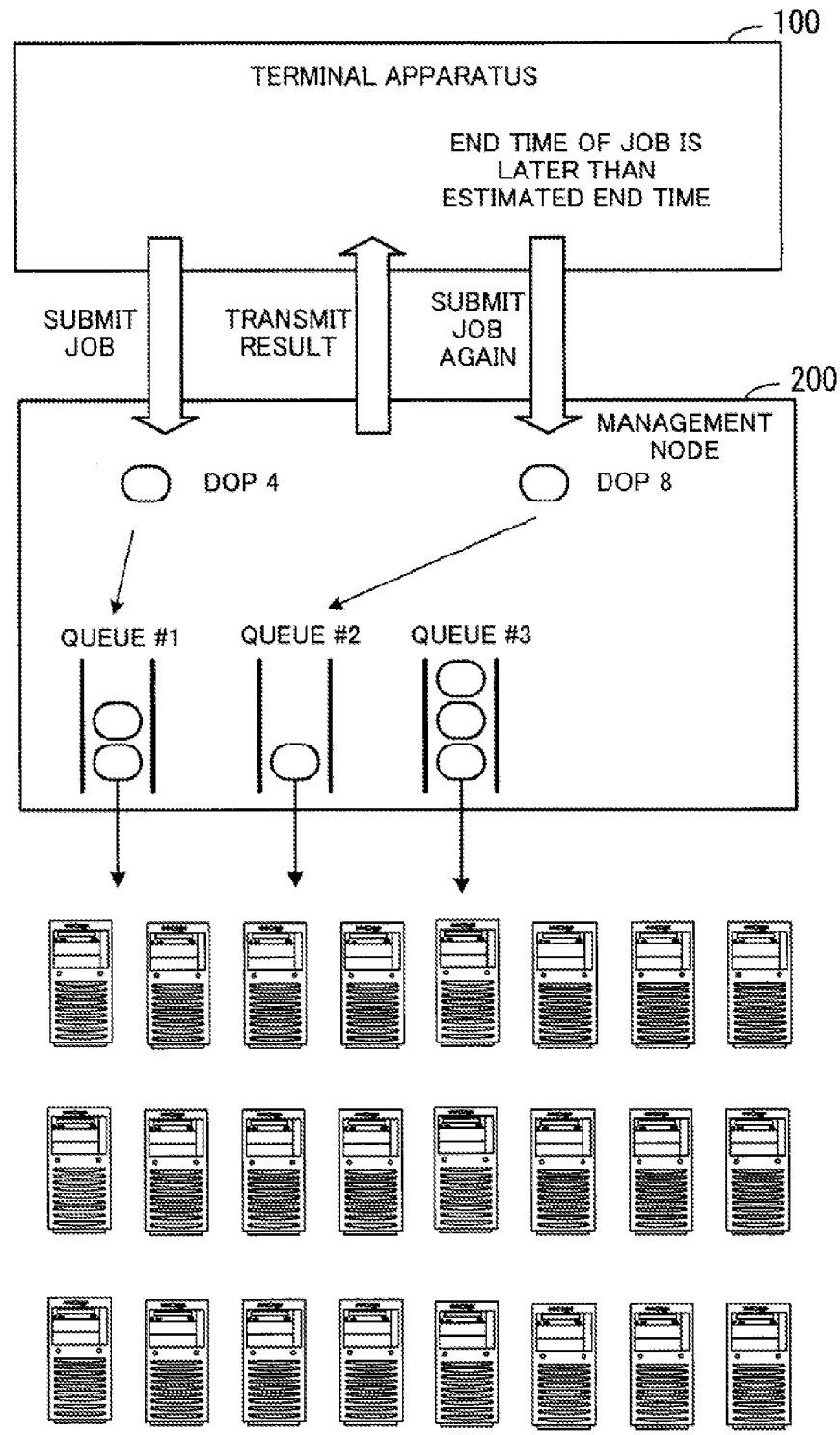
FIG. 7 illustrates an example of submitting a job again.

FIG. 7 illustrates an example of submitting a job again. It is assumed that the terminal apparatus 100 first submits to the management node 200 a job with a degree of parallelism of "4", specifying the queue #1 as the destination queue. The management node 200 queues the submitted job to the queue #1, and determines an execution schedule. Then, the management node 200 transmits, to the terminal apparatus 100, information including a scheduled start time and an execution time limit for the submitted job as the submission result.

The terminal apparatus 100 obtains a scheduled end time of the job based on the submission result. Then, if the scheduled end time of the job is later than the time estimated before submission of the job, the terminal apparatus 100 considers changing the parameters such as the degree of parallelism for the job, submission destination queue, and the like. If the scheduled end time of the job is likely to be advanced by changing the parameters, the terminal apparatus 100 cancels the previously submitted job, and submits the job again after changing the degree of parallelism or the submission destination queue.

In this manner, since the terminal apparatus 100 submits a job with appropriate parameters, it is possible to reduce the turnaround time of the job. The appropriate parameter values are determined by the terminal apparatus 100 based on the number of available computing nodes and so on.

Figure 8:
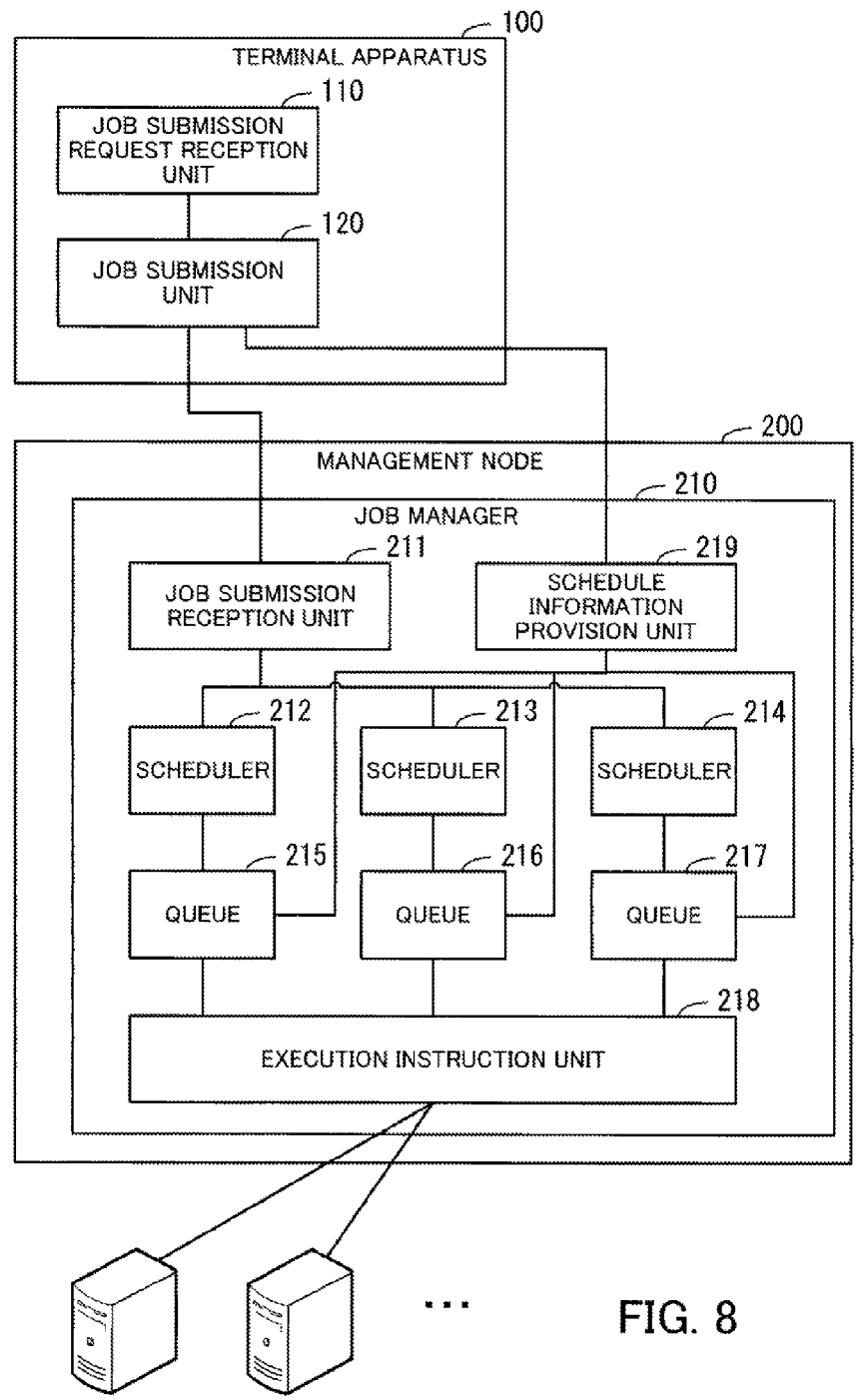
FIG. 8 is a block diagram illustrating functions of a terminal apparatus and a management node.

FIG. 8 is a block diagram illustrating functions of the terminal apparatus 100 and the management node 200. The terminal apparatus 100 includes a job submission request reception unit 110 and a job submission unit 120. The job submission request reception unit 110 is a graphical user interface that receives an input of information on a job to be submitted. The job submission request reception unit 110 receives an input of the elapsed time limit for execution with the maximum degree of parallelism or execution with a degree of parallelism of "1". The elapsed time limit indicates the maximum execution time allowed for a job. The elapsed time limit is an example of the execution time described in the first embodiment.

The job submission unit 120 calculates parameters that minimize the turnaround time of the job, based on the job submission request received by the job submission request reception unit 110. For example, the job submission unit 120 acquires, from the management node 200, schedule information indicating an execution schedule of jobs registered in each queue. Then, the job submission unit 120 checks, for each queue, the job execution status and execution schedule of the computing nodes that may be used by that queue, based on the schedule information. The job submission unit 120 determines the degree of parallelism and the submission destination queue that achieve the earliest completion of the job as the parameter values. Then, the job submission unit 120 submits the job with the calculated parameter values to the management node 200. Further, if the resulting execution schedule of the submitted job indicates that the execution is completed later than the scheduled time, the job submission unit 120 cancels the job, and submits the job again with different parameter values.

Note that the job submission unit 120 is an example of a function including the start time calculation unit 11, the execution time calculation unit 12, the end time calculation unit 13, and the registration unit 14 of the information processing apparatus 10 of FIG. 1.

The management node 200 includes a job manager 210. The job manager 210 manages jobs to be executed by the computing nodes. The job manager 210 includes a job submission reception unit 211, schedulers 212 to 214, queues 215 to 217, an execution instruction unit 218, and a schedule information provision unit 219.

The job submission reception unit 211 receives a submission of a job from the terminal apparatus 100. The job submission reception unit 211 transmits, to the scheduler managing the queue specified upon the job submission, a job execution request for execution of the submitted job.

Each of the schedulers 212 to 214 queues the received job execution request to the corresponding one of the queues 215 to 217. When queuing the job execution request, each of the schedulers 212 to 214 allocates computing nodes to the job, and determines a scheduled start time to start execution of the job. Then, each of the schedulers 212 to 214 queues the received job execution request to the corresponding one of the queues 215 to 217. The identifiers of allocated computing nodes and the scheduled start time are added to the queued job execution request.

The queues 215 to 217 accumulate job execution requests waiting for execution.

When the scheduled start time of a job comes, the execution instruction unit 218 removes the corresponding job execution request from any of the queues 215 to 217, and transmits the job execution request to the computing nodes allocated to the job.

The schedule information provision unit 219 transmits the schedule information on job execution requests registered in the queues 215 to 217 to the terminal apparatus 100. For example, upon receiving a schedule information acquisition request from the job submission unit 120 of the terminal apparatus 100, the schedule information provision unit 219 collects schedule information from the queues 215 to 217, and transmits the schedule information to the job submission unit 120.

Note that the lines connecting the elements in FIG. 8 represent some of communication paths. Communication paths other than those of FIG. 8 may be provided. Further, the functions of each element illustrated in FIG. 8 may be provided by, for example, causing a computer to execute a program module corresponding to the element.

Next, a description will be given of a GUI display screen of the job submission request reception unit 110. For example, the job submission request reception unit 110 displays, on the monitor 21, a job submission request entry screen for entering the value of the maximum degree of parallelism and so on.

Figure 9:
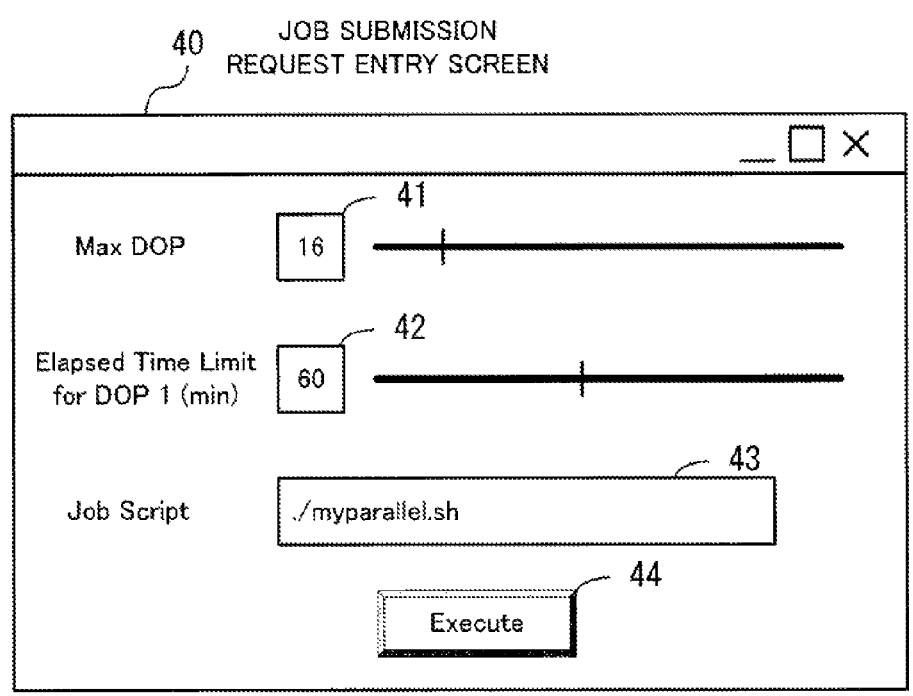
FIG. 9 illustrates an example of a job submission request entry screen.

FIG. 9 illustrates an example of a job submission request entry screen. A job submission request entry screen 40 includes an entry section 41 for the maximum degree of parallelism, an entry section 42 for the elapsed time limit for a degree of parallelism of "1", an entry section 43 for a job script, and an execute button 44.

In the entry section 41, a value indicating the maximum degree of parallelism for a job to be submitted is entered. The user enters a value in the entry section 41, or changes the value in the entry section 41 by moving a slider displayed on the right.

In the entry section 42, an elapsed time limit for a job upon execution with a degree of parallelism of "1" (upon non-parallel execution) is entered. The user enters a value in the entry section 42, or changes the value in the entry section 42 by moving a slider displayed on the right.

The entry section 43 is a text box for entering the identifier (the path and the file name) of a job script. The job script is a program in a script format describing the content of a job to be submitted. The job script includes information such as the degree of parallelism for the job to be executed, the elapsed time limit, and so on. The user enters, in the entry section 43, the identifier of the job script corresponding to the job to be submitted.

The execute button 44 is a button for entering a job submission request with the content entered on the job submission request entry screen 40. When the execute button 44 is pressed, the job submission request reception unit 110 transmits a job submission request containing the entered maximum degree of parallelism, elapsed time limit, and identified of the job script to the job submission unit 120.

In this manner, the user only needs to enter simple information on the GUI screen. Upon receiving a job submission request, the job submission unit 120 executes a job submission process.

Figure 10:
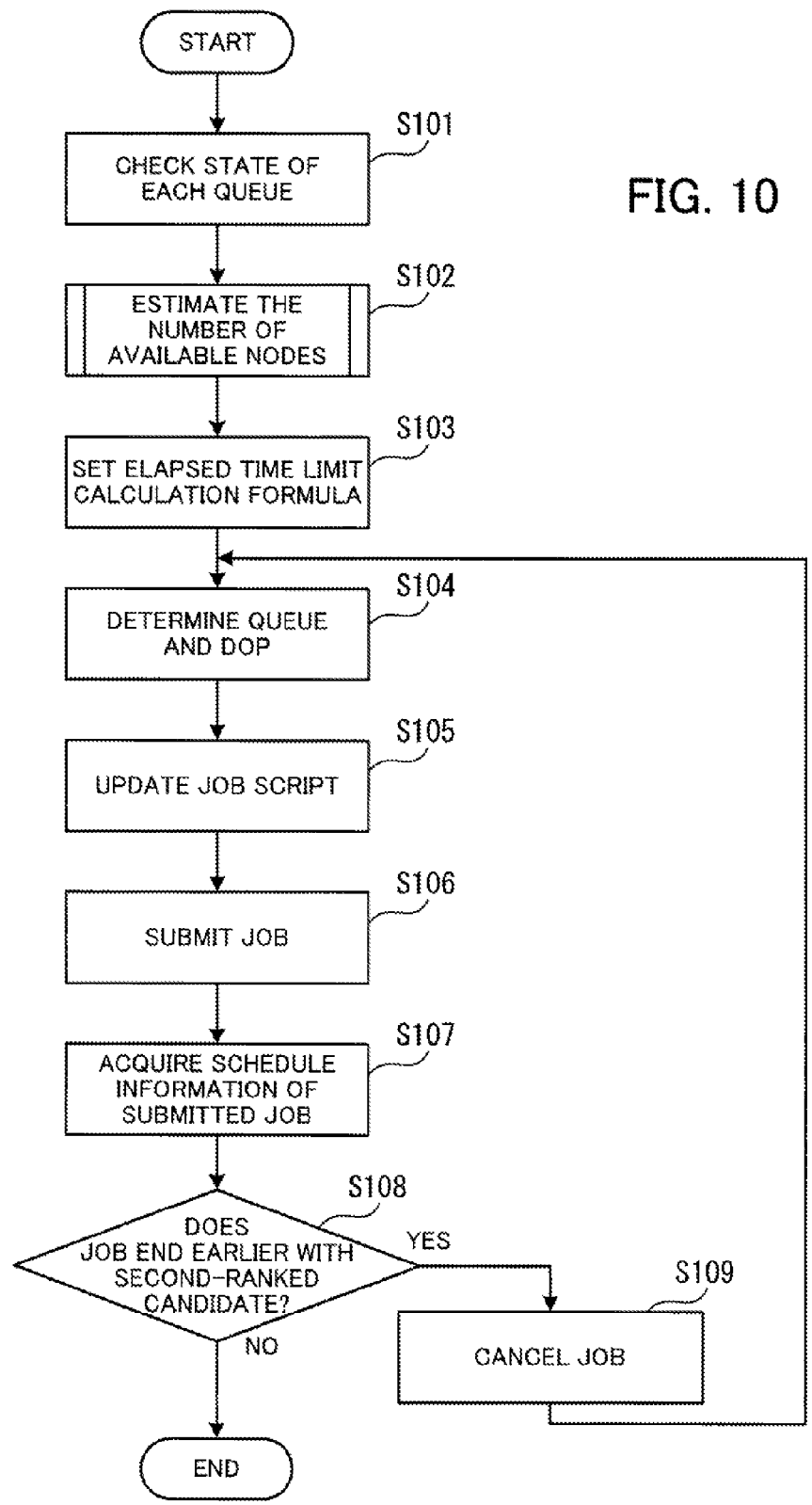
FIG. 10 is a flowchart illustrating an exemplary procedure of a job submission process.

FIG. 10 is a flowchart illustrating an exemplary procedure of a job submission process. In the following, the process illustrated in FIG. 10 will be described in order of step number.

(Step S101) The job submission unit 120 checks the state of each queue. For example, the job submission unit 120 transmits a schedule information acquisition request to the management node 200. The job submission unit 120 acquires schedule information transmitted from the management node 200 in response to the schedule information acquisition request.

(Step S102) The job submission unit 120 performs an available node count estimation process based on the schedule information. With the available node count estimation process, a graph representing the temporal changes in the number of available nodes is generated for each queue. The available node estimation process will be described below in greater detail (see FIG. 11).

(Step S103) The job submission unit 120 sets an elapsed time limit calculation formula based on the elapsed time limit for a job with a degree of parallelism of "1". For example, the job submission unit 120 obtains, based on the elapsed time limit for a degree of parallelism of "1", a relational expression representing a relationship between the degree of parallelism and the elapsed time limit in which the value of the elapsed time limit decreases as the degree of parallelism increases, and sets the obtained relational expression as an elapsed time limit calculation formula. When the degree of parallelism for a job is determined, the elapsed time limit is obtained from the elapsed time limit calculation formula.

(Step S104) The job submission unit 120 determines a submission destination queue and the degree of parallelism that give the earliest estimated end time of the job, based on the estimation result of the number of available computing nodes obtained in step S102. For example, the job submission unit 120 calculates, for each pair of a queue and a degree of parallelism, the earliest time when the job to be submitted becomes executable with that queue and that degree of parallelism, based on the result of the available node count estimation process, and sets the calculated earliest time as the estimated start time. Further, the job submission unit 120 calculates the elapsed time limit for that degree of parallelism, based on the elapsed time limit calculation formula. Then, the job submission unit 120 calculates an estimated end time for that pair of a queue and a degree of parallelism by adding the value of the elapsed time limit to the estimated start time. The job submission unit 120 calculates an estimated end time for each of the possible pairs of a queue and a degree of parallelism, and determines the pair of a queue and a degree of parallelism that gives the earliest estimated end time as a pair of a queue and a degree of parallelism that is applied to the job to be submitted.

(Step S105) The job submission unit 120 updates the job script based on the determined degree of parallelism. For example, the job submission unit 120 overwrites the degree of parallelism in the job script with the determined degree of parallelism. Further, the job submission unit 120 overwrites the elapsed time limit in the job script with the elapsed time limit determined based on the elapsed time limit calculation formula.

(Step S106) The job submission unit 120 submits the job to the management node 200. For example, the job submission unit 120 transmits to the management node 200 the job script of the job to be submitted, with the identifier of the submission destination queue attached thereto.

(Step S107) The job submission unit 120 acquires schedule information of the submitted job. For example, the job submission unit 120 transmits to the management node 200 a schedule information acquisition request specifying the submission destination queue of the submitted job. The schedule information provision unit 219 of the management node 200 transmits to the terminal apparatus 100 schedule information of the queue specified in the schedule information acquisition request. The job submission unit 120 acquires the schedule information transmitted from the management node 200. The job submission unit 120 calculates the estimated end time of the submitted job, based on the acquired schedule information. For example, the schedule information includes the estimated start time and the elapsed time limit for the submitted job. Thus, the job submission unit 120 calculates an estimated end time by adding the value of the elapsed time limit to the estimated start time of the submitted job.

(Step S108) The job submission unit 120 compares the estimated end time of the job for a pair of the queue ranked in the second place in step S104 and a degree of parallelism, with the estimated end time based on the schedule information acquired in step S107. Then, the job submission unit 120 determines whether the job ends earlier with the second-ranked candidate. If the job ends earlier with the second-ranked candidate, the process proceeds to step S109. If not, the job submission process ends. The job submission process also ends if there is no second-ranked candidate.

(Step S109) The job submission unit 120 cancels the submitted job. For example, the job submission unit 120 transmits a request to cancel the job submitted in step S106 to the management node 200. Further, the job submission unit 120 sets, as the estimated end time corresponding to the pair of a queue and a degree of parallelism determined in the previous step S104, the estimated end time calculated based on the schedule information acquired in step S107. Thereafter, the process returns to step S104.

With this procedure, the job submission process is performed. Next, the available node count estimation process will be described in detail.

Figure 11:
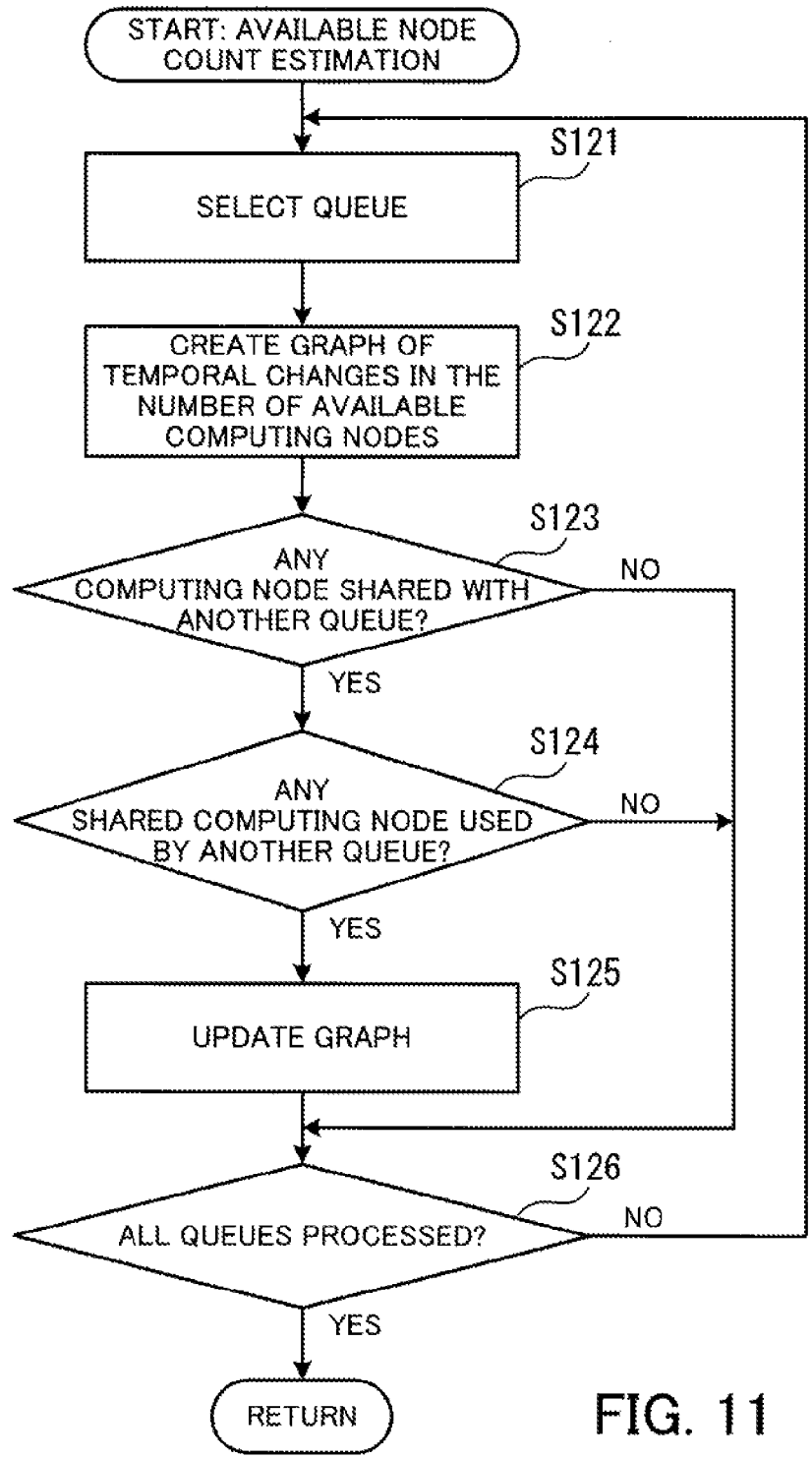
FIG. 11 is a flowchart illustrating an exemplary procedure of an available node count estimation process.

FIG. 11 is a flowchart illustrating an exemplary procedure of an available node count estimation process. In the following, the process illustrated in FIG. 11 will be described in order of step number.

(Step S121) The job submission unit 120 selects an unprocessed queue from among the queues of the job manager 210.

(Step S122) Based on schedule information of the selected queue, the job submission unit 120 creates a graph representing the temporal changes in the number of available computing nodes among the computing nodes that may be used by the corresponding queue.

(Step S123) The job submission unit 120 determines whether there is any computing node shared by the selected queue and another queue. For example, the job submission unit 120 obtains, for each of the queues 215 to 217, the identifiers of the usable computing nodes from the job manager 210. Then, the job submission unit 120 compares the usable computing nodes between queues to determine whether there is any common node, and thereby determines whether there is any computing node shared by the selected queue and another queue. If there is a shared computing node, the process proceeds to step S124. If there is no shared computing node, the process proceeds to step S126.

(Step S124) The job submission unit 120 determines whether there is any computing node that is being used or to be used by the other queue, among the computing nodes shared by the selected queue and the other queue. If there is such a computing node, the process proceeds to step S125. If there is not such a computing node, the process proceeds to step S126.

(Step S125) The job submission unit 120 reflects, to the graph of the selected queue, the number of computing nodes that are used or to be used by the other queues among the computing nodes that may be used by the selected queue.

(Step S126) The job submission unit 120 determines whether all the queues are processed. If all the queues are processed, the available node count estimation process ends. If there is an unprocessed queue, the process returns to step S121.

In this manner, with the processes of FIGS. 10 and 11, it is possible to specify a queue and a degree of parallelism that give the earliest estimated end time of the job, and submit the job. In the following, the processes of FIGS. 10 and 11 will be described in greater detail.

Figure 12:
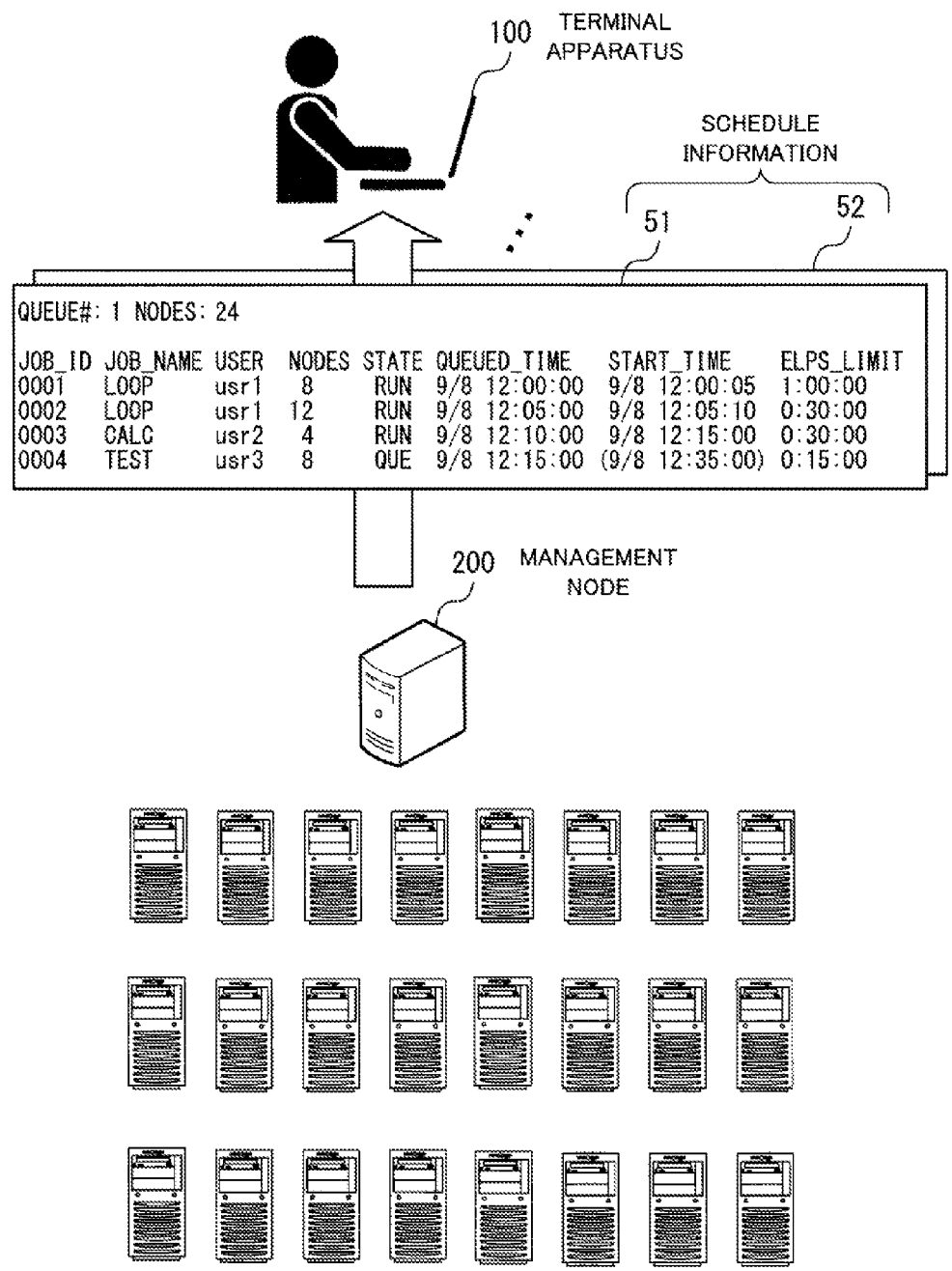
FIG. 12 illustrates an example of a schedule information acquisition process.

FIG. 12 illustrates an example of a schedule information acquisition process. For example, when the user enters a job submission request to the terminal apparatus 100, the job submission request reception unit 110 receives the job submission request. Then, the job submission request is transmitted to the job submission unit 120.

Upon receiving the job submission request, the job submission unit 120 connects to the management node 200 by using encryption and authentication techniques called Secure Shell (SSH). Then, the job submission unit 120 of the terminal apparatus 100 transmits a command for acquiring schedule information to the job manager 210 of the management node 200. The job manager 210 executes the command, and collects information such as the job execution status and so on for each queue. Then, the job manager 210 transmits pieces of schedule information 51, 52, and so on of the respective queues to the terminal apparatus 100.

Each of the pieces of schedule information 51, 52, and so on includes the identifier (QUEUE #) of the corresponding queue and the number of nodes (NODES) that may be used. Each of the pieces of schedule information 51, 52, and so on also includes, for each job, the job ID (JOB_ID), the job name (JOB_NAME), the user (USER), the number of computing nodes (NODES), the state (STATE), the queued time (QUEUED_TIME), the start time (START_TIME), and the elapsed time limit (ELPS_LIMIT). The job ID indicates the identifier of the job. The job name indicates the name of the job. The user indicates the name of the user using the terminal apparatus 100 that submitted the job. The number of computing nodes indicates how many computing nodes are used to execute the job (degree of parallelism). The state indicates the state of the job. The state includes running (RUN) and being queued (QUE). The queued time indicates the date and time when the job was queued. The start time indicates the execution start time or the scheduled start time of the job. The execution start time indicates the time when execution of a currently running job was started. The scheduled start time is the time when execution of a job waiting to run is scheduled to be started. The elapsed time limit indicates the maximum time needed to execute the job.

Each of the pieces of schedule information 51, 52, and so on may include the identifiers the computing nodes that may be used by the queue. Each of the pieces of schedule information 51, 52, and so on may also include the identifiers of the computing nodes allocated to each job. When each of the pieces of schedule information 51, 52, and so on includes these information items, it is possible to determine whether there is any shared computing node in steps S123 and S124 of FIG. 11.

The job submission unit 120 creates a graph representing the temporal changes in the number of available computing nodes, based on each of the pieces of schedule information 51, 52, and so on. For example, the job submission unit 120 calculates the temporal changes in the number of available computing nodes by subtracting the number of computing nodes in use at each time point from the number of nodes that may be used by the queue.

Figure 13:
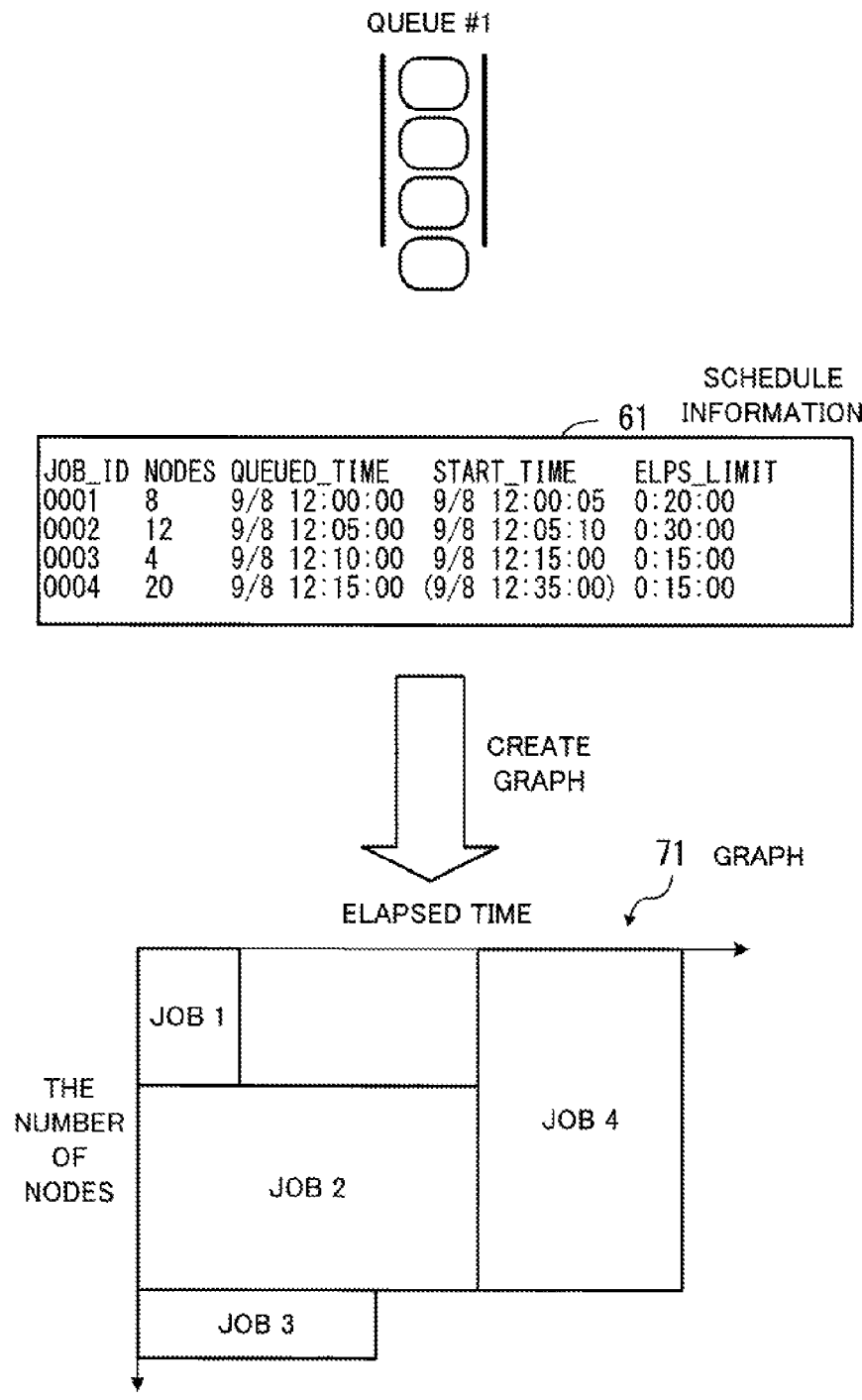
FIG. 13 illustrates a first example of a graph.

FIG. 13 illustrates a first example of a graph. In the example of FIG. 13, schedule information 61 of a "queue

1" includes information on four jobs. The execution time period of each job is a time period from the execution start time or the scheduled start time to the time after lapse of the elapsed time limit. Thus, the job submission unit 120 generates a graph 71 in which the vertical axis represents the number of nodes and the horizontal axis represents the elapsed time. The graph 71 contains rectangles corresponding to the respective jobs. The width of each rectangle corresponding to a job in the horizontal direction indicates the execution time of the job. The width of the rectangle in the vertical direction indicates the number of nodes used by the job. The left side of the rectangle is aligned with the execution start time or the scheduled start time of the job.

Figure 14:
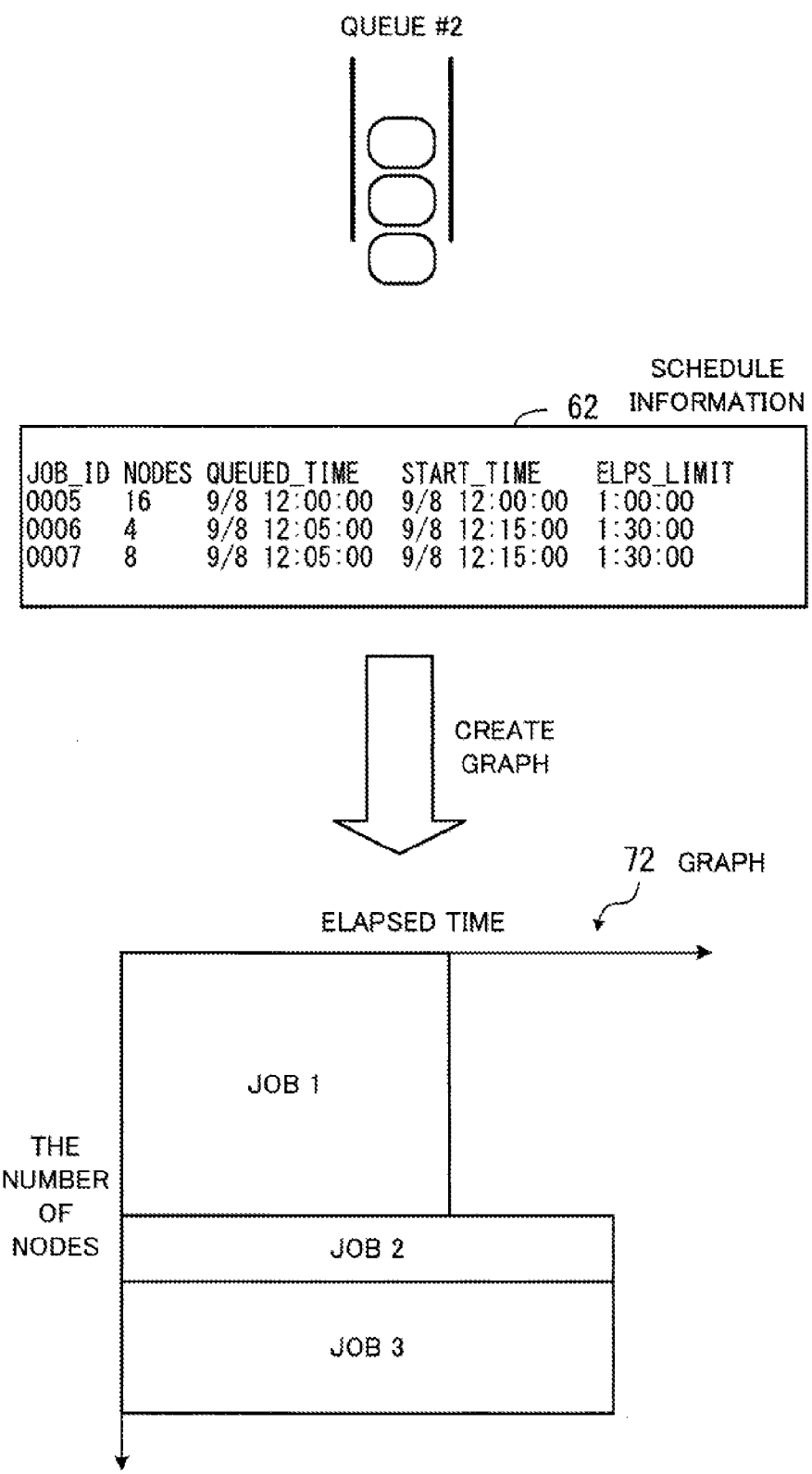
FIG. 14 illustrates a second example of a graph.

FIG. 14 illustrates a second example of a graph. In the example of FIG. 14, schedule information 62 of a "queue #2" includes information on three jobs. Accordingly, a graph 72 containing three rectangles corresponding to the respective jobs is generated.

The temporal changes in the number of available computing nodes may be estimated based on the graphs 71 and 72 of FIGS. 13 and 14.

Figure 15:
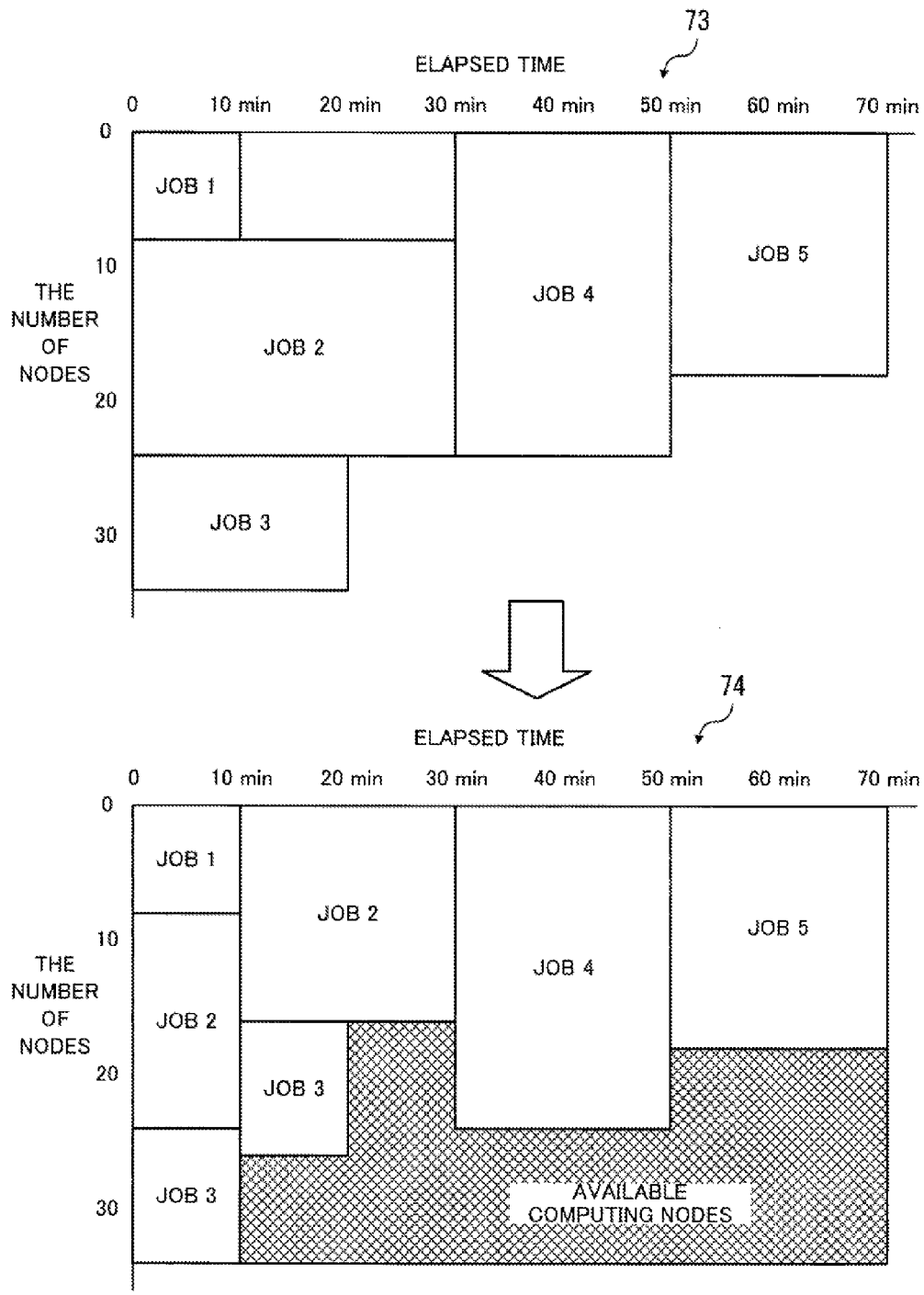
FIG. 15 illustrates an example of estimating the number of available computing nodes.

FIG. 15 illustrates an example of estimating the number of available computing nodes. The job submission unit 120 divides rectangles contained in a generated graph 73 into smaller rectangles and moves the smaller rectangles toward the top so as to generate a graph 74 in which the areas representing available computing nodes are put together. The graph 74 clearly illustrates how many computing nodes are available at each point in elapsed time. Mathematically, the temporal changes in the number of available computing nodes are calculated by subtracting the total number of computing nodes used by the respective jobs at each point in elapsed time from the number of computing nodes that may be used by the queue.

Note that FIGS. 13 to 15 illustrate an example of the case in which there is no computing node shared with other queues. In reality, however, some computing nodes are often shared by multiple queues as illustrated in FIG. 6. Thus, the number of available computing nodes of each queue is calculated by taking into account the shared computing nodes.

Figure 16:
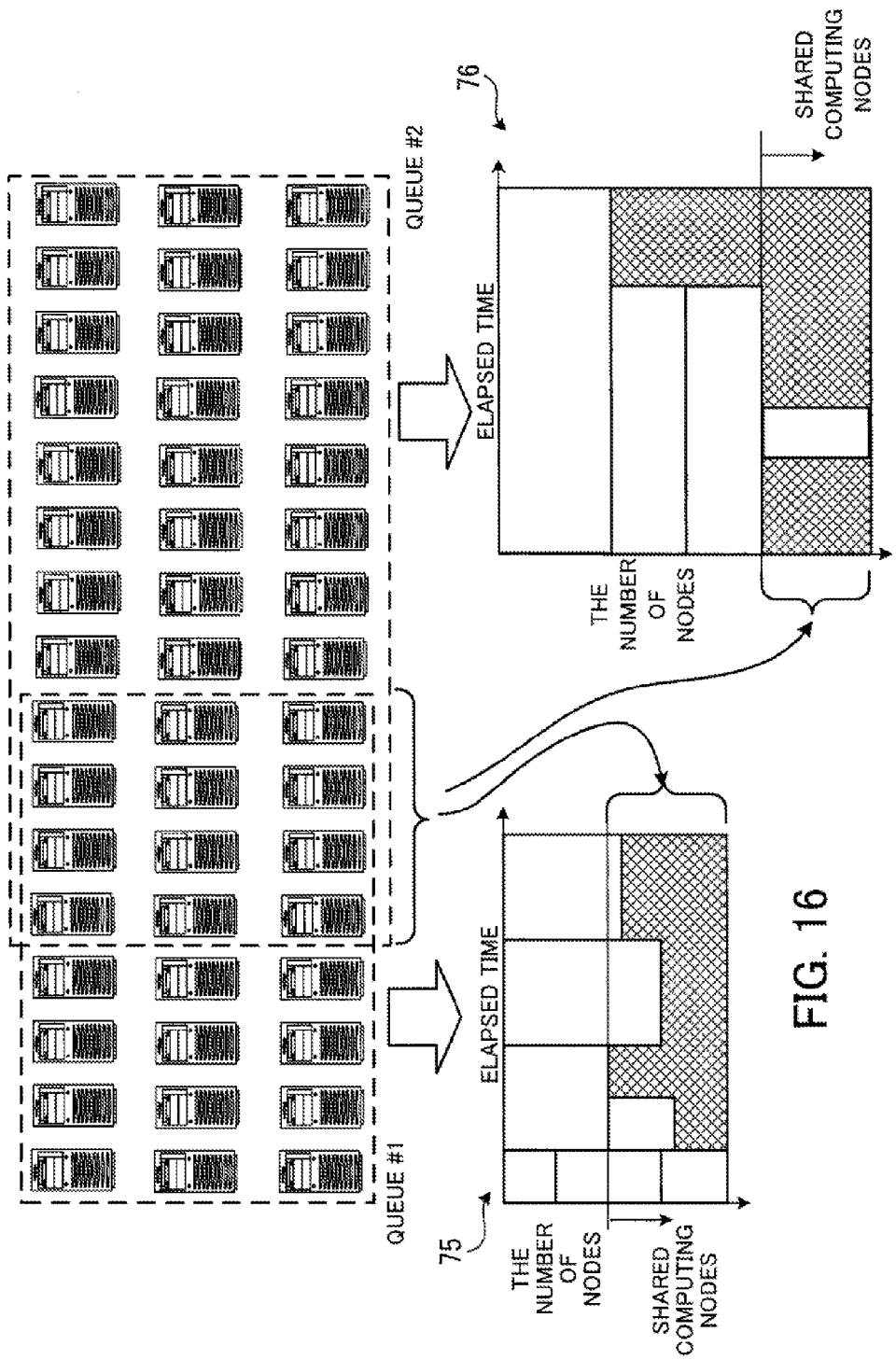
FIG. 16 illustrates an example of the case in which there are shared computing nodes.

FIG. 16 illustrates an example of the case in which there are shared computing nodes. As illustrated in FIG. 16, computing nodes are often shared by different queues. In this case, the job submission unit 120 checks the usage of the shared computing nodes, in a job of the other queue that may use the shared computing nodes. In the example of FIG. 16, in each queue, computing nodes that are not shared with other queues are preferentially allocated to a job. If there is no non-shared computing node, shared computing nodes are allocated to a job.

In the example of FIG. 16, when estimating the number of available computing nodes of the queue #1, the job submission unit 120 detects a job that uses shared computing nodes from a graph 76 of the queue #2. Then, the job submission unit 120 treats the computing nodes used by the detected job as equivalent to the computing nodes used by the jobs in the queue #1, and updates a graph 75 of the queue #1.

Figure 17:
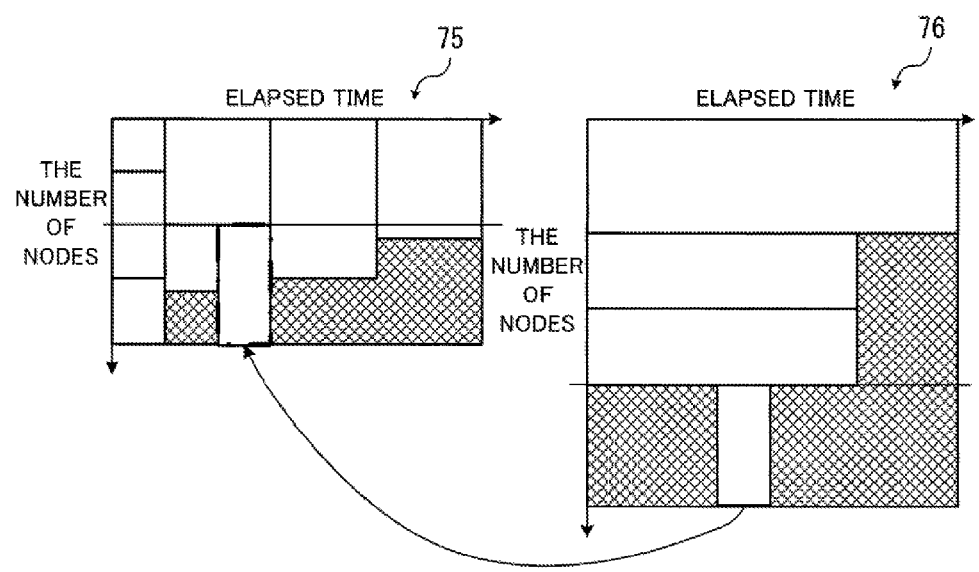
FIG. 17 illustrates an example of reflecting the usage of shared computing nodes.

FIG. 17 illustrates an example of reflecting the usage of shared nodes. As illustrated in FIG. 17, the allocation of shared computing nodes to jobs is reflected to the graph 75 corresponding to the queue #1.

In the manner as described above, graphs of the respective queues are obtained. After knowing the number of available computing nodes at each point in elapsed time from the graphs, the job submission unit 120 calculates the degree of parallelism with which a job is executable by the available computing nodes and the time period in which the job is executable with that degree of parallelism.

Figure 18:
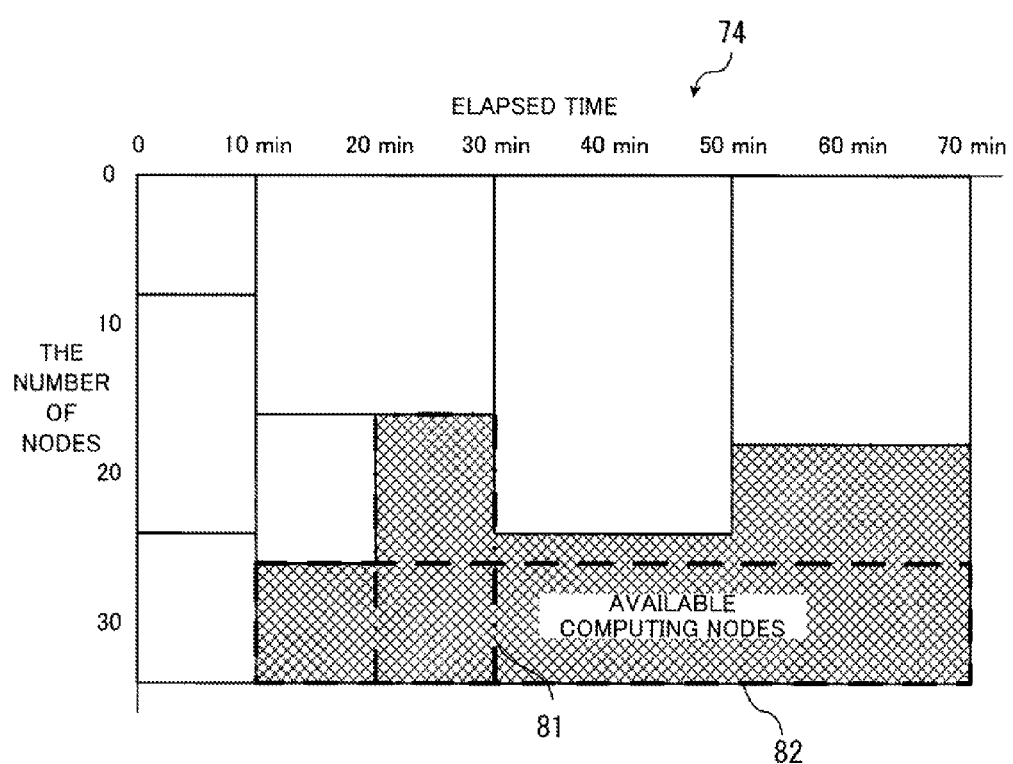
FIG. 18 illustrates an example of detecting the degree of parallelism with which a job is executable by available computing nodes and the time period in which the job is executable.

FIG. 18 illustrates an example of detecting the degree of parallelism with which a job is executable by available computing nodes and the time period in which the job is executable. The job submission unit 120 generates rectangles 81 and 82 that fit in the area of the available computing nodes. If a job to be submitted is executable with the degree of parallelism and the time period indicated by either one of the rectangles 81 and 82, the job submission unit 120 specifies that rectangle as an available resource.

The job submission unit 120 lists the available resources for each queue, and generates an available resource list.

Figure 19:
FIG. 19 illustrates an example of an available resource list.

FIG. 19 illustrates an example of an available resource list. Each of available resource lists 91, 92, and so on generated for the respective queues includes available resource records for the respective rectangles in the graph. Each available resource record includes the degree of parallelism, the available time, and the estimated start time. The degree of parallelism indicates the degree of parallelism of the available resource. In the graph, the degree of parallelism of the available resource is represented by the width of the rectangle in the direction indicating the number of nodes. The available time indicates a period of time during which the available resource may be used. In the graph, the available time of the available resource is represented by the width of the rectangle in the direction indicating the elapsed time. The estimated start time indicates the time when the use of the available resource may be started. In the graph, the estimated start time of the available resource is the time obtained by adding the elapsed time corresponding to the left end of the rectangle to the current time.

After generating the available resource lists 91, 92, and so on of the respective queues, the job submission unit 120 generates an elapsed time limit calculation formula. The execution time of a job decreases as the degree of parallelism increases. Accordingly, the job submission unit 120 obtains, based on a user-entered elapsed time limit for a degree of parallelism of "1", a relational expression representing a relationship between the degree of parallelism and the elapsed time limit in which the value of the elapsed time limit decreases as the degree of parallelism increases.

Figure 20:
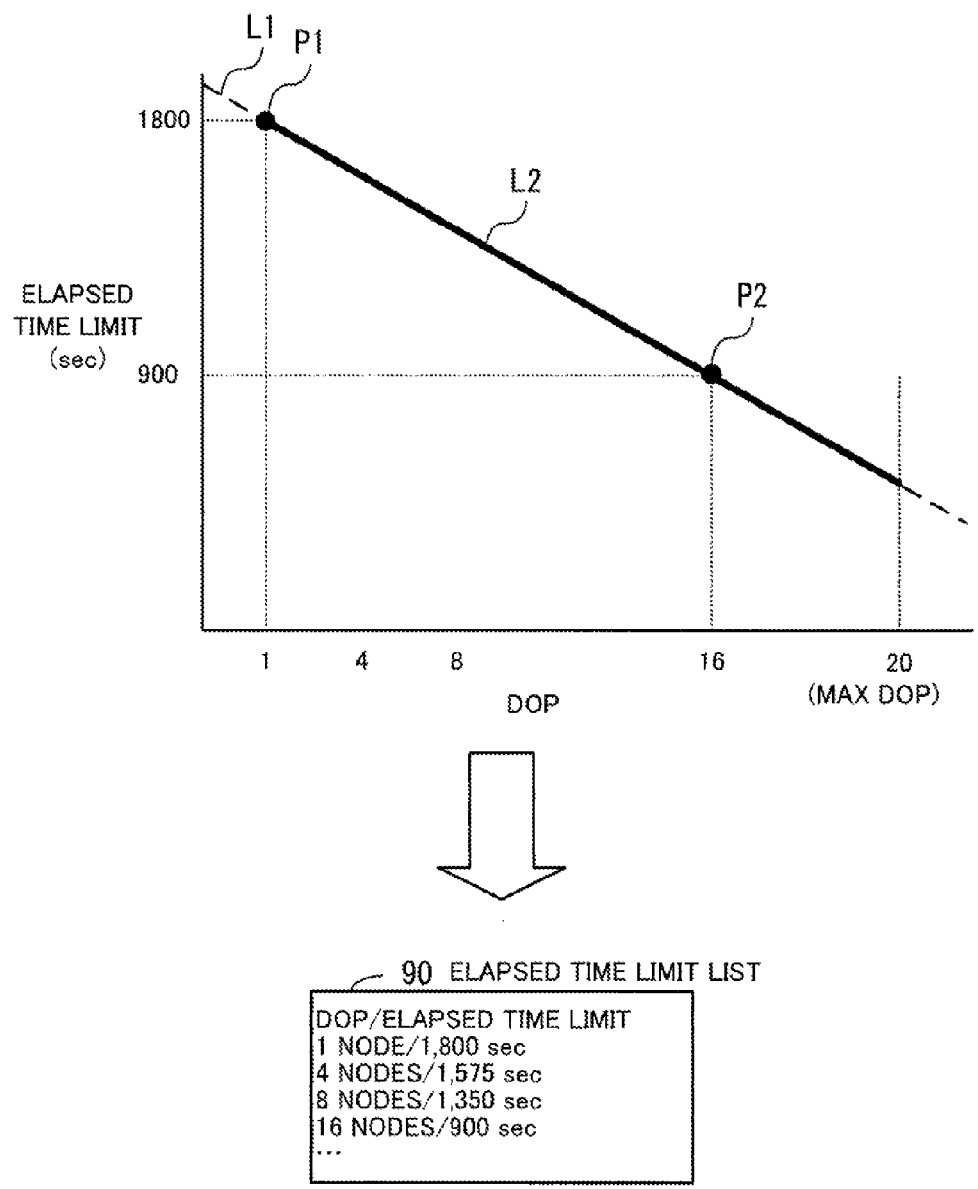
FIG. 20 illustrates an example of the relationship between the degree of parallelism and the elapsed time limit.

FIG. 20 illustrates an example of the relationship between the degree of parallelism and the elapsed time limit. In the example of FIG. 20, it is assumed that the job processing speed obtained with a degree of parallelism of "16" is double the job processing speed obtained with a degree of parallelism of "1". The job submission unit 120 generates a graph in which the horizontal axis represents the degree of parallelism and the vertical axis represents the elapsed time limit. Then, the job submission unit 120 plots, on the graph, a point P1 indicating a user-entered elapsed time limit for a degree of parallelism of "1". In the example of FIG. 20, the elapsed time limit for a degree of parallelism of "1" is 1,800 seconds. Then, the job submission unit 120 plots, on the graph, a point P2 indicating a position where the elapsed time limit for the degree of parallelism of "16" is "900", which is half of 1,800. Then, the job submission unit 120 generates a line L1 passing through the point P1 and the point P2. Further, the job submission unit 120 generates, on the line L1, a line segment L2 with its left end located at the position of a degree of parallelism of "1", and with its right end located at the position of the maximum degree of parallelism. The expression representing the line segment L2 is set as the elapsed time limit calculation formula.

In this manner, the elapsed time limit for a degree of parallelism of "1" is entered by the user, and the rate of decrease in elapsed time limit in the case where parallelization is applied is set in advance in the job submission unit 120. Note that, for example, when a job is executed with a degree of parallelism of "8", it does not mean that the execution time is reduced to one-eighth. The rate of decrease in elapsed time limit due to parallelization is set to be low enough to reliably complete a job within the elapsed time limit. For example, in the example of FIG. 20, although it is assumed that the execution time is reduced to one-half when the degree of parallelism is 16, this rate of decrease may be appropriately adjusted.

It is possible to calculate the elapsed time limit for a job corresponding to the degree of parallelism, based on the elapsed time limit calculation formula represented by the line segment L2. The job submission unit 120 calculates the elapsed time limit for a job, for each of the degrees of parallelism from a degree of parallelism of "1" to the maximum degree of parallelism, and sets each elapsed time limit in an elapsed time limit list 90.

The job submission unit 120 calculates, for each available resource of each queue, an estimated end time of a job in the case where the job is executed with a degree of parallelism corresponding to the maximum number of available computing nodes, based on the elapsed time limit list 90. Then, the job submission unit 120 sorts the available resources in the order of earlier estimated end time.

Figure 21:
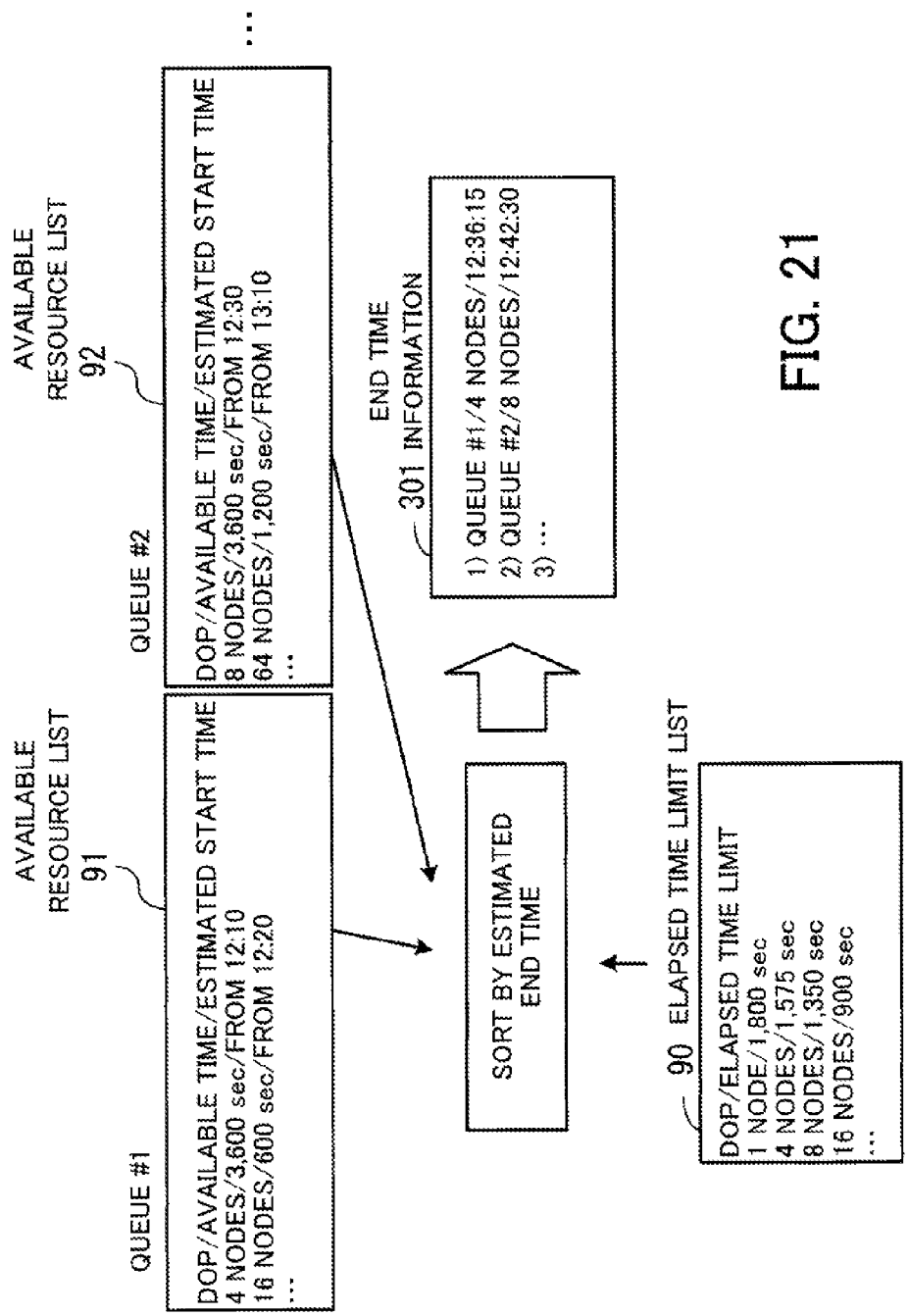
FIG. 21 illustrates an example of sorting available resources.

FIG. 21 illustrates an example of sorting available resources. For example, the job submission unit 120 sequentially selects one of the available resource records from the available resource lists 91, 92, and so on. The job submission unit 120 refers to the elapsed time limit list 90, and obtains the elapsed time limit corresponding to the degree of parallelism indicated in the selected available resource record. If the obtained elapsed time limit is longer than the available time indicated in the selected available resource record, the job submission unit 120 determines that it is not possible to execute the job to be submitted by using the available resource indicated in the selected available resource record, and excludes that available resource record from records to be output. If the obtained elapsed time limit is equal to or shorter than the available time indicated in the selected available resource record, the job submission unit 120 calculates an estimated end time for the available resource record by adding the value of the elapsed time limit to the estimated start time indicated in the available resource record.

When all the available resource records are processed, the job submission unit 120 sorts the available resource records each including an estimated end time, in the order of earlier estimated end time. The job submission unit 120 outputs the result of sorting as end time information 301. The end time information 301 includes entries each representing one of the available resource records. Each entry includes the rank determined by sorting, the identifier of the queue, the degree of parallelism, and the estimated end time.

The job submission unit 120 determines a pair of a queue and a degree of parallelism indicated in the available resource record that is listed at the top of the end time information 301 as parameters of the job to be submitted.

When the parameters of the job are determined, the job submission unit 120 reflects the value of the degree of parallelism to the job script. That is, the job directs execution of an application using a shell script. A shell script for executing a job is a job script. A job script includes a process corresponding to the degree of parallelism. Therefore, the job submission unit 120 automatically changes the description in the script in accordance with the determined degree of parallelism.

Figure 22:
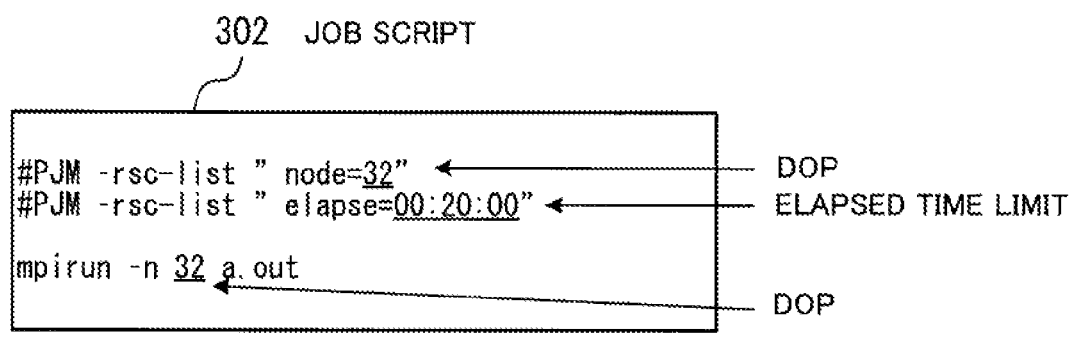
FIG. 22 illustrates an example of updating a job script.

FIG. 22 illustrates an example of updating a job script. A job script 302 includes values corresponding to the degree of parallelism and the elapsed time limit. Thus, the job submission unit 120 changes the value corresponding to the degree of parallelism in the job script 302 to the value indicating the degree of parallelism determined as a parameter of the job to be submitted. The job submission unit 120 also changes the value corresponding to the elapsed time limit in the job script 302 to the value of the elapsed time limit corresponding to the determined degree of parallelism. The elapsed time limit corresponding to the degree of parallelism may be obtained from the elapsed time limit list 90.

The method of identifying the modified portions in the job script 302 is specified in advance in the job submission unit 120. In the example of FIG. 22, modified portions may be identified by detecting specific strings such as "-rsc-list", "mpirun", or the like in the job script 302.

After updating the job script 302, the job submission unit 120 specifies a destination queue, and submits a job to the management node 200. The management node 200 transmits an execution request of the submitted job to the scheduler of the specified queue. Then, the scheduler schedules execution of the submitted job, and the execution request of the job is queued to the corresponding queue.

When the job is queued, the job manager 210 transmits to the terminal apparatus 100 the scheduled start time and the elapsed time limit for the queued job. In the terminal apparatus 100, the job submission unit 120 compares the time (scheduled end time) obtained by adding the value of the elapsed time limit to the scheduled start time of the submitted job, with the estimated end time for the available resource indicated as the second-ranked candidate in the end time information 301. If the scheduled end time of the submitted job is earlier, the job submission process ends.

If the estimated end time for the second-ranked candidate is earlier than the scheduled end time of the submitted job, the job submission unit 120 cancels the submitted job. Then, the job submission unit 120 submits the job again, with the pair of a queue and a degree of parallelism of the available resource indicated as the second-ranked candidate. In this step, the job submission unit 120 updates, in the end time information 301, the estimated end time of the available resource corresponding to the parameters of the canceled job to the scheduled end time, and sorts the entries in the end time information 301 in the order of earlier estimated end time.

This comparison with the second-ranked candidate is repeated until there is no second-ranked candidate that gives an estimated end time earlier than the scheduled end time. In this manner, even when the exact algorithm of the scheduler is unknown, it is possible to reliably submit a job execution request specifying appropriate parameters.

(c) Other Embodiments

In the embodiments described above, the degree of parallelism for a job and the submission destination queue are determined not by a management node, but by the information processing apparatus 10 or the terminal apparatus 100. However, this determination process may be performed by a management node.

While particular embodiments of the present invention have been illustrated and described, it would be obvious that the components described in the embodiments may be replaced with other components having similar functions. Further, other arbitrary structures and steps may be added. Furthermore, two or more arbitrary structures (features) of the embodiments described above may be combined.

According to one aspect, it is possible to automatically set an appropriate job execution condition.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory; and
a processor connected to the memory and configured to perform a procedure including:
acquiring schedule information indicating an execution schedule of a job execution request registered in each one of at least one queue,
generating a plurality of job execution conditions each indicating one of the at least one queue as a registration destination queue and one of a plurality of degrees of parallelism as a designated degree of parallelism,
calculating an estimated start time for each of the plurality of job execution conditions, based on the schedule information, the estimated start time indicating an estimated time at which execution of a new job starts when a new job execution request for execution of the new job with the designated degree of parallelism is registered in the registration destination queue,
calculating an execution time of the new job for each of the plurality of degrees of parallelism, based on an execution time of the new job with a predetermined degree of parallelism,
calculating an estimated end time for said each job execution condition, based on the estimated start time for said each job execution condition and the execution time of the new job with the designated degree of parallelism indicated in said each job execution condition, the estimated end time indicating an estimated time at which execution of the new job ends when the new job execution request specifying the designated degree of parallelism indicated in said each job execution condition is registered in the registration destination queue indicated in said each job execution condition, and
registering the new job execution request for execution of the new job with the designated degree of parallelism indicated in an earliest job execution condition that gives an earliest execution end time among the plurality of job execution conditions, in the registration destination queue indicated in the earliest job execution condition.

2. The information processing apparatus according to claim 1, wherein the registering includes:
acquiring an execution schedule of the new job execution request that is registered in accordance with the earliest job execution condition; and
when a scheduled end time calculated for the earliest job execution condition is later than the estimated end time calculated for another one of the plurality of job execution conditions, canceling the new job execution request that is registered in accordance with the earliest job execution condition, and registering a revised new job execution request for execution of the new job with the designated degree of parallelism indicated in said another job execution condition, in the registration destination queue indicated by said another job execution condition, the scheduled end time being calculated by adding the execution time of the new job with the designated degree of parallelism indicated in the earliest job execution condition to a scheduled execution start time indicating an execution start time of the new job on the acquired execution schedule.

3. The information processing apparatus according to claim 1, wherein the calculating an estimated start time includes:
calculating temporal changes in a number of available computing nodes not executing a job, among a set of computing nodes that execute the job execution request accumulated in the registration destination queue indicated in said each job execution condition; and
specifying, as the estimated start time for said each job execution condition, an earliest time in an available period in which available computing nodes whose number corresponds to the designated degree of parallelism indicated in said each job execution condition are present in the temporal changes.

4. The information processing apparatus according to claim 3, wherein:
the calculating an estimated start time includes calculating an available time indicating a length of the available period, in the temporal changes in the registration destination queue indicated in said each job execution condition; and
the calculating an estimated end time includes stopping calculation of the estimated end time for said each job execution condition when the available time calculated for said each job execution condition is less than the execution time with the designated degree of parallelism indicated in said each job execution condition.

5. A job submission method comprising:
acquiring schedule information indicating an execution schedule of a job execution request registered in each one of at least one queue;
generating a plurality of job execution conditions each indicating one of the at least one queue as a registration destination queue and one of a plurality of degrees of parallelism as a designated degree of parallelism;
calculating, by a processor, an estimated start time for each of the plurality of job execution conditions, based on the schedule information, the estimated start time indicating an estimated time at which execution of a new job starts when a new job execution request for execution of the new job with the designated degree of parallelism is registered in the registration destination queue;
calculating, by the processor, an execution time of the new job for each of the plurality of degrees of parallelism, based on an execution time of the new job with a predetermined degree of parallelism;
calculating, by the processor, an estimated end time for said each job execution condition, based on the estimated start time for said each job execution condition and the execution time of the new job with the designated degree of parallelism indicated in said each job execution condition, the estimated end time indicating an estimated time at which execution of the new job ends when the new job execution request specifying the designated degree of parallelism indicated in said each job execution condition is registered in the registration destination queue indicated in said each job execution condition; and registering, by the processor, the new job execution request for execution of the new job with the designated degree of parallelism indicated in an earliest job execution condition that gives an earliest execution end time among the plurality of job execution conditions, in the registration destination queue indicated in the earliest job execution condition.

6. A non-transitory computer-readable storage medium storing a computer program that causes a computer to perform a procedure comprising:

acquiring schedule information indicating an execution schedule of a job execution request registered in each one of at least one queue;

generating a plurality of job execution conditions each indicating one of the at least one queue as a registration destination queue and one of a plurality of degrees of parallelism as a designated degree of parallelism;

calculating an estimated start time for each of the plurality of job execution conditions, based on the schedule information, the estimated start time indicating an estimated time at which execution of a new job starts when a new job execution request for execution of the new job with the designated degree of parallelism is registered in the registration destination queue;

calculating an execution time of the new job for each of the plurality of degrees of parallelism, based on an execution time of the new job with a predetermined degree of parallelism;

calculating an estimated end time for said each job execution condition, based on the estimated start time for the job execution condition and the execution time of the new job with the designated degree of parallelism indicated in said each job execution condition, the estimated end time indicating an estimated time at which execution of the new job ends when the new job execution request specifying the designated degree of parallelism indicated in said each job execution condition is registered in the registration destination queue indicated in said each job execution condition; and registering the new job execution request for execution of the new job with the designated degree of parallelism indicated in an earliest job execution condition that gives an earliest execution end time among the plurality of job execution conditions, in the registration destination queue indicated in the earliest job execution condition.

* * * * *